United States Patent
Hyakudai et al.

(10) Patent No.: US 10,931,072 B2
(45) Date of Patent: Feb. 23, 2021

(54) TRANSMITTING DEVICE, RECEPTION DEVICE, AND OPTICAL-ELECTRICAL COMPOSITE CABLE

(71) Applicant: SONY SEMICONDUCTOR SOLUTIONS CORPORATION, Kanagawa (JP)

(72) Inventors: Toshihisa Hyakudai, Kanagawa (JP); Atsushi Mori, Kanagawa (JP); Naoto Nagaki, Tokyo (JP); Manabu Sakai, Kanagawa (JP); Hiroshi Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/476,998

(22) PCT Filed: Oct. 26, 2017

(86) PCT No.: PCT/JP2017/038749
§ 371 (c)(1),
(2) Date: Jul. 10, 2019

(87) PCT Pub. No.: WO2018/135065
PCT Pub. Date: Jul. 26, 2018

(65) Prior Publication Data
US 2019/0356096 A1    Nov. 21, 2019

(30) Foreign Application Priority Data

Jan. 23, 2017    (JP) .................................. 2017-009409

(51) Int. Cl.
*G02B 6/42*    (2006.01)
*H04B 10/03*    (2013.01)
(Continued)

(52) U.S. Cl.
CPC ............... *H01R 29/00* (2013.01); *G02B 6/40* (2013.01); *H04B 10/03* (2013.01); *H04B 10/80* (2013.01)

(58) Field of Classification Search
CPC ...... H04B 10/03; H04B 10/80; H04B 10/548; G02B 6/4292
See application file for complete search history.

(56) References Cited

U.S. PATENT DOCUMENTS

2002/0164899 A1    11/2002    Nakura et al.
2006/0088251 A1*    4/2006    Wang .................. G02B 6/4201
                                                                385/88
(Continued)

FOREIGN PATENT DOCUMENTS

CN    102227661 A    10/2011
CN    103682785 A    3/2014
(Continued)

OTHER PUBLICATIONS

International Search Report and Written Opinion of PCT Application No. PCT/JP2017/038749, dated Jan. 23, 2018, 09 pages of ISRWO.

*Primary Examiner* — Eric Wong
(74) *Attorney, Agent, or Firm* — Chip Law Group

(57) ABSTRACT

It is desirable to provide a technology capable of improving reliability in light transmission and convenience at the time of connecting a transmission device to a cable with a simple circuit configuration. A transmitting device is provided which includes a connector receptacle unit connected to an optical-electrical composite cable, in which the connector receptacle unit includes a first electrode group, a second electrode group provided at a position rotated from the first electrode group by 180 degrees about a center of a main body of the connector receptacle unit as a reference, a first connection unit group for transmitting optical signals, and a (Continued)

second connection unit group for transmitting optical signals provided at a position rotated from the first connection unit group for transmitting optical signals by 180 degrees about the center of the main body of the connector receptacle unit as a reference.

19 Claims, 17 Drawing Sheets

(51) Int. Cl.
*H01R 29/00* (2006.01)
*G02B 6/40* (2006.01)
*H04B 10/80* (2013.01)

(56) References Cited

U.S. PATENT DOCUMENTS

| | | | |
|---|---|---|---|
| 2006/0134990 A1* | 6/2006 | Van Der Mee | H01R 13/502 439/638 |
| 2010/0080563 A1 | 4/2010 | Difonzo et al. | |
| 2010/0150552 A1* | 6/2010 | Furuyama | H04B 10/808 398/38 |
| 2011/0162030 A1* | 6/2011 | Doi | G02B 6/4469 725/127 |
| 2011/0243505 A1* | 10/2011 | Su | H01R 31/06 385/75 |
| 2012/0183262 A1* | 7/2012 | Schwandt | G02B 6/3886 385/88 |
| 2013/0089290 A1* | 4/2013 | Sloey | G02B 6/389 385/74 |
| 2013/0089291 A1 | 4/2013 | Jol et al. | |
| 2014/0153077 A1* | 6/2014 | Kawakami | H04L 27/364 359/259 |
| 2015/0110444 A1 | 4/2015 | Tanaka et al. | |
| 2018/0017742 A1* | 1/2018 | Louderback | G02B 6/4415 |
| 2020/0177283 A1* | 6/2020 | Komatsu | H04B 10/516 |

FOREIGN PATENT DOCUMENTS

| | | |
|---|---|---|
| JP | 2002-334741 A | 11/2002 |
| JP | 2012-504312 A | 2/2012 |
| JP | 2013-532351 A | 8/2013 |
| JP | 2014-011050 A | 1/2014 |
| JP | 2016-184858 A | 10/2016 |
| KR | 10-2012-0130794 A | 12/2012 |
| KR | 10-2013-0047700 A | 5/2013 |
| TW | 201635770 A | 10/2016 |
| WO | 2010/039656 A1 | 4/2010 |
| WO | 2011/150403 A1 | 12/2011 |
| WO | 2014/003063 A1 | 1/2014 |
| WO | 2016/152015 A1 | 9/2016 |

* cited by examiner

FIG. 10A

| | TRANSMISSION DEVICE (10A) | | | CABLE (20) | | TRANSMISSION DEVICE (30A) | | |
|---|---|---|---|---|---|---|---|---|
| | 140 | 150 | 100 | 200 | 300 | 350 | 340 | |
| D1 | 141(O-1) 141(I-1) | 151 | 1031 | 2032 2032 | 1032 | 351 | 341(I-1) 341(O-1) | D1 |
| D2 | 141(O-2) 141(I-2) | 152 | 1033 | 2034 2034 | 1034 | 352 | 341(I-2) 341(O-2) | D2 |
| D3 | 142(O-1) 142(I-1) | 153 | 1035 | 2036 2036 | 1036 | 353 | 342(I-1) 342(O-1) | D3 |
| D4 | 142(O-2) 142(I-2) | 154 | 1037 | 2038 2038 | 1038 | 354 | 342(I-2) 342(O-2) | D4 |
| D5 | 143(O-1) 143(I-1) | 155 | 1039 | 20310 20310 | 10310 | 355 | 343(I-1) 343(O-1) | D5 |
| D6 | 143(O-2) 143(I-2) | 156 | 10311 | 20312 20312 | 10312 | 356 | 343(I-2) 343(O-2) | D6 |
| D7 | 144(O-1) 144(I-1) | 157 | 10313 | 20314 20314 | 10314 | 357 | 344(I-1) 344(O-1) | D7 |
| D8 | 144(O-2) 144(I-2) | 158 | 10315 | 20316 20316 | 10316 | 358 | 344(I-2) 344(O-2) | D8 |

FIG. 10B

| | TRANSMISSION DEVICE (10A) | | | | CABLE (20) | | TRANSMISSION DEVICE (30A) | | | |
|---|---|---|---|---|---|---|---|---|---|---|
| | 140 | | 150 | 100 | 200 | 300 | 350 | 340 | | |
| D1 | 141(I-1) | 141(O-1) | 151 | 1031 | 2032 | 1032 | 351 | 341(I-1) | 341(O-1) | D1 |
| D2 | 141(I-2) | 141(O-2) | 152 | 1033 | 2034 | 1034 | 352 | 341(I-2) | 341(O-2) | D2 |
| D3 | 142(I-1) | 142(O-1) | 153 | 1035 | 2036 | 1036 | 353 | 342(I-1) | 342(O-1) | D3 |
| D4 | 142(I-2) | 142(O-2) | 154 | 1037 | 2038 | 1038 | 354 | 342(I-2) | 342(O-2) | D4 |
| D5 | 143(I-1) | 143(O-1) | 155 | 1039 | 20310 | 10310 | 355 | 343(I-1) | 343(O-1) | D5 |
| D6 | 143(I-2) | 143(O-2) | 156 | 10311 | 20312 | 10312 | 356 | 343(I-2) | 343(O-2) | D6 |
| D7 | 144(I-1) | 144(O-1) | 157 | 10313 | 20314 | 10314 | 357 | 344(I-1) | 344(O-1) | D7 |
| D8 | 144(I-2) | 144(O-2) | 158 | 10315 | 20316 | 10316 | 358 | 344(I-2) | 344(O-2) | D8 |

FIG. 11A

| | TRANSMISSION DEVICE (10A) | | | | CABLE (20) | | TRANSMISSION DEVICE (30A) | | | | |
|---|---|---|---|---|---|---|---|---|---|---|---|
| | 140 | | 150 | 100 | 200 | | 300 | 350 | 340 | | |
| D1 | 141(I-1) | 141(O-1) | 151 | 1031 | 2034 | 2032 | 1032 | 351 | 341(I-1) | 341(O-1) | D1 |
| D2 | 141(I-2) | 141(O-2) | 152 | 1033 | 2032 | 2034 | 1034 | 352 | 341(I-2) | 341(O-2) | D2 |
| D3 | 142(I-1) | 142(O-1) | 153 | 1035 | 2038 | 2036 | 1036 | 353 | 342(I-1) | 342(O-1) | D3 |
| D4 | 142(I-2) | 142(O-2) | 154 | 1037 | 2036 | 2038 | 1038 | 354 | 342(I-2) | 342(O-2) | D4 |
| D5 | 143(I-1) | 143(O-1) | 155 | 1039 | 20312 | 20310 | 10310 | 355 | 343(I-1) | 343(O-1) | D5 |
| D6 | 143(I-2) | 143(O-2) | 156 | 10311 | 20310 | 20312 | 10312 | 356 | 343(I-2) | 343(O-2) | D6 |
| D7 | 144(I-1) | 144(O-1) | 157 | 10313 | 20316 | 20314 | 10314 | 357 | 344(I-1) | 344(O-1) | D7 |
| D8 | 144(I-2) | 144(O-2) | 158 | 10315 | 20314 | 20316 | 10316 | 358 | 344(I-2) | 344(O-2) | D8 |

FIG. 11B

| | TRANSMISSION DEVICE (10A) | | | CABLE (20) | | TRANSMISSION DEVICE (30A) | | |
|---|---|---|---|---|---|---|---|---|
| | 140 | 150 | 100 | 200 | 300 | 350 | 340 | |
| D1 | 141(I-1) 141(O-1) | 151 | 1031 | 2032 2034 | 1032 | 351 | 341(I-1) 341(O-1) | D1 |
| D2 | 141(I-2) 141(O-2) | 152 | 1033 | 2034 2032 | 1034 | 352 | 341(I-2) 341(O-2) | D2 |
| D3 | 142(I-1) 142(O-1) | 153 | 1035 | 2036 2038 | 1036 | 353 | 342(I-1) 342(O-1) | D3 |
| D4 | 142(I-2) 142(O-2) | 154 | 1037 | 2038 2036 | 1038 | 354 | 342(I-2) 342(O-2) | D4 |
| D5 | 143(I-1) 143(O-1) | 155 | 1039 | 20310 20312 | 10310 | 355 | 343(I-1) 343(O-1) | D5 |
| D6 | 143(I-2) 143(O-2) | 156 | 10311 | 20312 20310 | 10312 | 356 | 343(I-2) 343(O-2) | D6 |
| D7 | 144(I-1) 144(O-1) | 157 | 10313 | 20314 20316 | 10314 | 357 | 344(I-1) 344(O-1) | D7 |
| D8 | 144(I-2) 144(O-2) | 158 | 10315 | 20316 20314 | 10316 | 358 | 344(I-2) 344(O-2) | D8 |

FIG. 12A

| TRANSMISSION DEVICE (10A) | | | | CABLE (20) | | TRANSMISSION DEVICE (30A) | | | |
|---|---|---|---|---|---|---|---|---|---|
| | 140 | 150 | 100 | 200 | 300 | 350 | 340 | | |
| D1 | 141(I-1) | 151 | 1031 | 2032 | 1032 | 351 | 341(I-1) | 341(O-1) | D1 |
| D2 | 141(I-2) | 152 | 1033 | 2034 | 1034 | 352 | 341(I-2) | 341(O-2) | D2 |
| D3 | 142(I-1) | 153 | 1035 | 2036 | 1036 | 353 | 342(I-1) | 342(O-1) | D3 |
| D4 | 142(I-2) | 154 | 1037 | 2038 | 1038 | 354 | 342(I-2) | 342(O-2) | D4 |
| D5 | 143(I-1) | 155 | 1039 | 20310 | 10310 | 355 | 343(I-1) | 343(O-1) | D5 |
| D6 | 143(I-2) | 156 | 10311 | 20312 | 10312 | 356 | 343(I-2) | 343(O-2) | D6 |
| D7 | 144(I-1) | 157 | 10313 | 20314 | 10314 | 357 | 344(I-1) | 344(O-1) | D7 |
| D8 | 144(I-2) | 158 | 10315 | 20316 | 10316 | 358 | 344(I-2) | 344(O-2) | D8 |

FIG. 12B

| | TRANSMISSION DEVICE (10A) | | | CABLE (20) | | TRANSMISSION DEVICE (30A) | | | |
|---|---|---|---|---|---|---|---|---|---|
| | 140 | | 150 | 100 | 200 | 300 | 350 | 340 | |
| D1 | 141(I-1) | 141(O-1) | 151 | 1031 | 2032 | 2034 | 1032 | 351 | 341(I-1) | 341(O-1) | D1 |
| D2 | 141(I-2) | 141(O-2) | 152 | 1033 | 2034 | 2032 | 1034 | 352 | 341(I-2) | 341(O-2) | D2 |
| D3 | 142(I-1) | 142(O-1) | 153 | 1035 | 2036 | 2038 | 1036 | 353 | 342(I-1) | 342(O-1) | D3 |
| D4 | 142(I-2) | 142(O-2) | 154 | 1037 | 2038 | 2036 | 1038 | 354 | 342(I-2) | 342(O-2) | D4 |
| D5 | 143(I-1) | 143(O-1) | 155 | 1039 | 20310 | 20312 | 10310 | 355 | 343(I-1) | 343(O-1) | D5 |
| D6 | 143(I-2) | 143(O-2) | 156 | 10311 | 20312 | 20310 | 10312 | 356 | 343(I-2) | 343(O-2) | D6 |
| D7 | 144(I-1) | 144(O-1) | 157 | 10313 | 20314 | 20316 | 10314 | 357 | 344(I-1) | 344(O-1) | D7 |
| D8 | 144(I-2) | 144(O-2) | 158 | 10315 | 20316 | 20314 | 10316 | 358 | 344(I-2) | 344(O-2) | D8 |

FIG. 13A

| | TRANSMISSION DEVICE (10A) | | | | CABLE (20) | | | TRANSMISSION DEVICE (30A) | | | |
|---|---|---|---|---|---|---|---|---|---|---|---|
| | 140 | | 150 | 100 | 200 | 200 | 300 | 350 | 340 | | |
| D1 | 141(I-1) | 141(O-1) | 151 | 1031 | 2034 | 2034 | 1032 | 351 | 341(I-1) | 341(O-1) | D1 |
| D2 | 141(I-2) | 141(O-2) | 152 | 1033 | 2032 | 2032 | 1034 | 352 | 341(I-2) | 341(O-2) | D2 |
| D3 | 142(I-1) | 142(O-1) | 153 | 1035 | 2038 | 2038 | 1036 | 353 | 342(I-1) | 342(O-1) | D3 |
| D4 | 142(I-2) | 142(O-2) | 154 | 1037 | 2036 | 2036 | 1038 | 354 | 342(I-2) | 342(O-2) | D4 |
| D5 | 143(I-1) | 143(O-1) | 155 | 1039 | 20312 | 20312 | 10310 | 355 | 343(I-1) | 343(O-1) | D5 |
| D6 | 143(I-2) | 143(O-2) | 156 | 10311 | 20310 | 20310 | 10312 | 356 | 343(I-2) | 343(O-2) | D6 |
| D7 | 144(I-1) | 144(O-1) | 157 | 10313 | 20316 | 20316 | 10314 | 357 | 344(I-1) | 344(O-1) | D7 |
| D8 | 144(I-2) | 144(O-2) | 158 | 10315 | 20314 | 20314 | 10316 | 358 | 344(I-2) | 344(O-2) | D8 |

FIG. 13B

| | TRANSMISSION DEVICE (10A) | | | | CABLE (20) | | TRANSMISSION DEVICE (30A) | | | | |
|---|---|---|---|---|---|---|---|---|---|---|---|
| | 140 | | 150 | 100 | 200 | 200 | 300 | 350 | 340 | | |
| D1 | 141(I-1) | 141(O-1) | 151 | 1031 | 2034 | 2034 | 1032 | 351 | 341(I-1) | 341(O-1) | D1 |
| D2 | 141(I-2) | 141(O-2) | 152 | 1033 | 2032 | 2032 | 1034 | 352 | 341(I-2) | 341(O-2) | D2 |
| D3 | 142(I-1) | 142(O-1) | 153 | 1035 | 2038 | 2038 | 1036 | 353 | 342(I-1) | 342(O-1) | D3 |
| D4 | 142(I-2) | 142(O-2) | 154 | 1037 | 2036 | 2036 | 1038 | 354 | 342(I-2) | 342(O-2) | D4 |
| D5 | 143(I-1) | 143(O-1) | 155 | 1039 | 20312 | 20312 | 10310 | 355 | 343(I-1) | 343(O-1) | D5 |
| D6 | 143(I-2) | 143(O-2) | 156 | 10311 | 20310 | 20310 | 10312 | 356 | 343(I-2) | 343(O-2) | D6 |
| D7 | 144(I-1) | 144(O-1) | 157 | 10313 | 20316 | 20316 | 10314 | 357 | 344(I-1) | 344(O-1) | D7 |
| D8 | 144(I-2) | 144(O-2) | 158 | 10315 | 20314 | 20314 | 10316 | 358 | 344(I-2) | 344(O-2) | D8 |

TRANSMITTING DEVICE, RECEPTION DEVICE, AND OPTICAL-ELECTRICAL COMPOSITE CABLE

CROSS REFERENCE TO RELATED APPLICATIONS

This application is a U.S. National Phase of International Patent Application No. PCT/JP2017/038749 filed on Oct. 26, 2017, which claims priority benefit of Japanese Patent Application No. JP 2017-009409 filed in the Japan Patent Office on Jan. 23, 2017. Each of the above-referenced applications is hereby incorporated herein by reference in its entirety.

TECHNICAL FIELD

The present disclosure relates to a transmitting device, a reception device, and an optical-electrical composite cable.

BACKGROUND ART

In recent years, as a technology for transmitting a video signal (Video signal) by using a plurality of lanes, the high-definition multimedia interface (HDMI, registered trademark), a display port (simply referred to as "DP" below), and the like have been known. In these standards, a situation increases in which an ultra-high definition video signal such as a 4K video signal and an 8K video signal is transmitted.

A transmission speed of such an ultra-high definition video signal has been exceeding several 10 Gbps to 100 Gbps. However, in a case where such a video signal is transmitted by using a metal material cable, it has been difficult to transmit the video signal for a distance of several meters. Under such circumstances, there is a case where a transmission distance can be extended by using light transmission by using an optical fiber instead of transmission of an electrical signal by using the metal material cable, and an active optical cable (AOC) has appeared in the market.

The AOC includes an electrical connector, and the electrical connector connects between a device and a cable with an electrical signal. Furthermore, the AOC includes an optical-electric converter in a cable plug. The AOC converts an electrical signal into an optical signal by the optical-electric converter and transmits the optical signal which has been converted from the electrical signal through the optical fiber. On the other hand, unlike the AOC, a technology has been disclosed in which a device is directly and optically connected to a cable and a redundant optical fiber is used so as to cope with breakage of the fiber specific for the optical transmission, deterioration in an optical element, and the like (refer to Patent Document 1).

CITATION LIST

Patent Document

Patent Document 1: Japanese Patent Application Laid-Open No. 2016-184858

SUMMARY OF THE INVENTION

Problems to be Solved by the Invention

However, it is desirable to provide a technology capable of improving reliability in light transmission and convenience at the time of connecting a transmission device to a cable with a simple circuit configuration.

Solutions to Problems

According to the present disclosure, a transmitting device is provided which includes a connector receptacle unit connected to an optical-electrical composite cable, in which the connector receptacle unit includes a first electrode group, a second electrode group provided at a position rotated from the first electrode group by 180 degrees about a center of a main body of the connector receptacle unit as a reference, a first connection unit group for transmitting optical signals, and a second connection unit group for transmitting optical signals provided at a position rotated from the first connection unit group for transmitting optical signals by 180 degrees about the center of the main body of the connector receptacle unit as a reference.

According to the present disclosure, a reception device is provided which includes a connector receptacle unit connected to an optical-electrical composite cable, in which the connector receptacle unit includes a first electrode group, a second electrode group provided at a position rotated from the first electrode group by 180 degrees about a center of a main body of the connector receptacle unit as a reference, a first connection unit group for receiving optical signals, and a second connection unit group for receiving optical signals provided at a position rotated from the first connection unit group for receiving optical signals by 180 degrees about the center of the main body of the connector receptacle unit as a reference.

According to the present disclosure, an optical-electrical composite cable is provided which includes a transmission-side connector plug connected to a transmitting device, in which the transmission-side connector plug includes a transmission-side electrode group connected to a first electrode group or a second electrode group of a connector receptacle unit of the transmitting device and an optical fiber group connected to a connection unit group for transmitting optical signals of the connector receptacle unit of the transmitting device.

Effects of the Invention

As described above, according to the present disclosure, a technology is provided which is capable of improving reliability in light transmission and convenience at the time of connecting a transmission device to a cable with a simple circuit configuration. Note that the above effects are not necessarily limited, and any effect described in the present specification or other effect that may be recognized from the present specification may be obtained together with or instead of the above effects.

BRIEF DESCRIPTION OF DRAWINGS

FIG. 10A is a diagram illustrating a state before connection destination switching in a case where both connector plugs are connected as facing upward.

FIG. 10B is a diagram illustrating a state after the connection destination switching in a case where both connector plugs are connected as facing upward.

FIG. 11A is a diagram illustrating a state before the connection destination switching in a case where the connector plug is connected to the transmission-side transmission device as facing downward.

FIG. 11B is a diagram illustrating a state after the connection destination switching in a case where the connector plug is connected to the transmission-side transmission device as facing downward.

FIG. 12A is a diagram illustrating a state before the connection destination switching in a case where the connector plug is connected to the reception-side transmission device as facing downward.

FIG. 12B is a diagram illustrating a state after the connection destination switching in a case where the connector plug is connected to the reception-side transmission device as facing downward.

FIG. 13A is a diagram illustrating a state before the connection destination switching in a case where both connector plugs are connected as facing downward.

FIG. 13B is a diagram illustrating a state after the connection destination switching in a case where both connector plugs are connected as facing downward.

MODE FOR CARRYING OUT THE INVENTION

Figure 1:
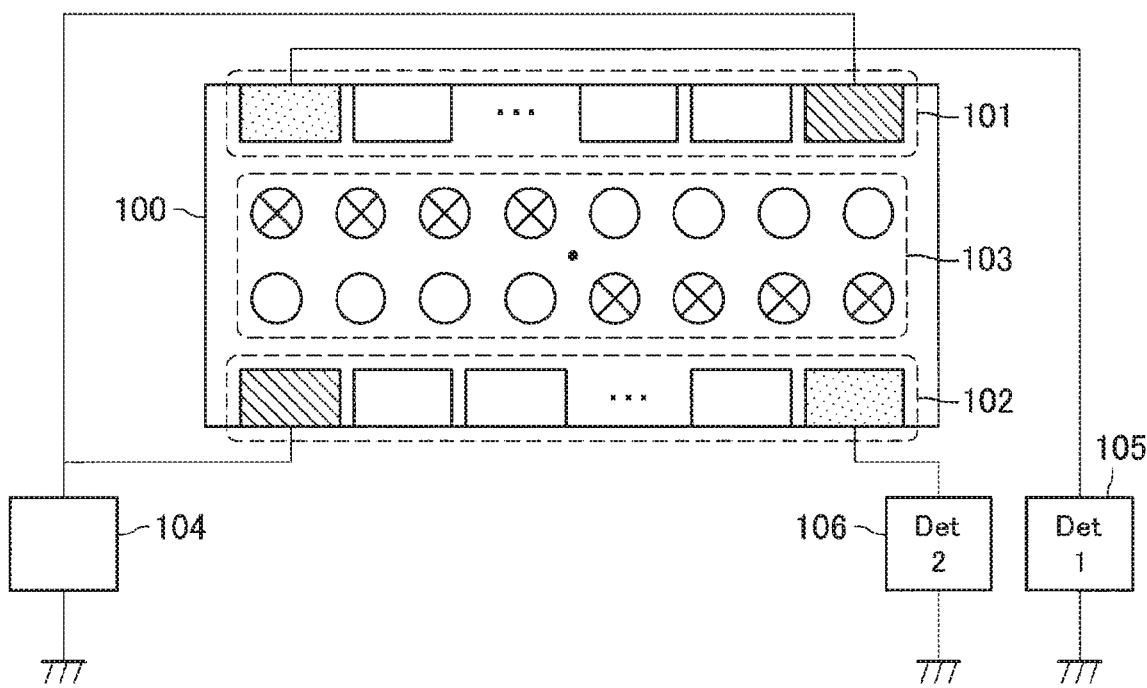
FIG. 1 is a diagram illustrating a configuration of a connector receptacle unit included in a transmission device according to a first embodiment.

Hereinafter, preferred embodiments of the present disclosure will be described in detail with reference to the accompanying drawings. Note that, in the present specification and the drawings, components having substantially the same functional configuration are denoted with the same reference numeral so as to omit redundant description.

Furthermore, in the present specification and the drawings, a plurality of components having substantially the same functional configuration is distinguished from each other by attaching different numerals after the same reference. However, in a case where it is not necessary to particularly distinguish the plurality of components having substantially the same functional configuration from each other, only the same reference numeral is applied. Furthermore, components similar to each other in different embodiments are distinguished from each other by adding different alphabets after the same reference numeral.

Note that the description will be made in the following order.

0. Summary
1. First Embodiment
1.1. Description of configuration
1.2. Description of operation
2. Second Embodiment
2.1. Description of configuration
3. Conclusion

0. SUMMARY

First, an outline of the present embodiment will be described. In recent years, as a technology for transmitting a video signal (Video signal) by using a plurality of lanes, the high-definition multimedia interface (HDMI), a display port (simply referred to as "DP" below), and the like have been known. In these standards, a situation increases in which an ultra-high definition video signal such as a 4K video signal and an 8K video signal is transmitted.

A transmission speed of such an ultra-high definition video signal has been exceeding several 10 Gbps to 100 Gbps. However, in a case where such a video signal is transmitted by using a metal material cable, it has been difficult to transmit the video signal for a distance of several meters. Under such circumstances, in a case where a transmission distance can be extended by using light transmission by using an optical fiber instead of the transmission of the electrical signal by using the metal material cable, and an active optical cable (AOC) has appeared in the market.

The AOC includes an electrical connector, and the electrical connector connects between a device and a cable with an electrical signal. Furthermore, the AOC includes an optical-electric converter in a cable plug. The AOC converts an electrical signal into an optical signal by the optical-electric converter and transmits the optical signal which has been converted from the electrical signal through the optical fiber. However, in the AOC, a general metal material cable for simply transmitting a high-speed signal is only replaced with an optical fiber, and a protection unit against the breakage of the fiber specific for the optical transmission, the deterioration in the optical element, and the like does not exist. Furthermore, since the AOC uses a general connector structure, unlike a USB Type-C and the like, connection cannot be made without considering upward/downward direction of the connector.

On the other hand, unlike the AOC, a technology has been disclosed in which a device is directly and optically connected to a cable and a redundant optical fiber is used so as to cope with breakage of the fiber specific for the optical transmission, deterioration in an optical element, and the like (refer to Japanese Patent Application Laid-Open No. 2016-184858). However, in the above technology, it is premised to use a transmission format different from the general HDMI and DP, and implementation of the transmission format increases cost.

Therefore, in the present specification, a technology capable of improving reliability in light transmission and convenience at the time of connecting a transmission device to a cable with a simple circuit configuration without changing a general transmission format used in the HDMI, the DP, and the like as possible will be mainly described.

The outline of the present embodiment has been described above.

1. FIRST EMBODIMENT

Subsequently, a first embodiment will be described.
(1-1. Description of Configuration)
First, an exemplary configuration of a signal transmission system 1A according to the first embodiment will be described. FIG. 1 is a diagram illustrating a configuration of a connector receptacle unit included in a transmission device according to the first embodiment. The connector receptacle unit has an optical-electrical composite connector structure. Details will be described. A connector receptacle unit main body is a portion engaged with a connector plug 200 of an optical-electrical composite cable 20 to be described later, and a structure viewed from a direction of a connection surface connected to the connector plug 200 is illustrated in FIG. 1.

Figure 2:
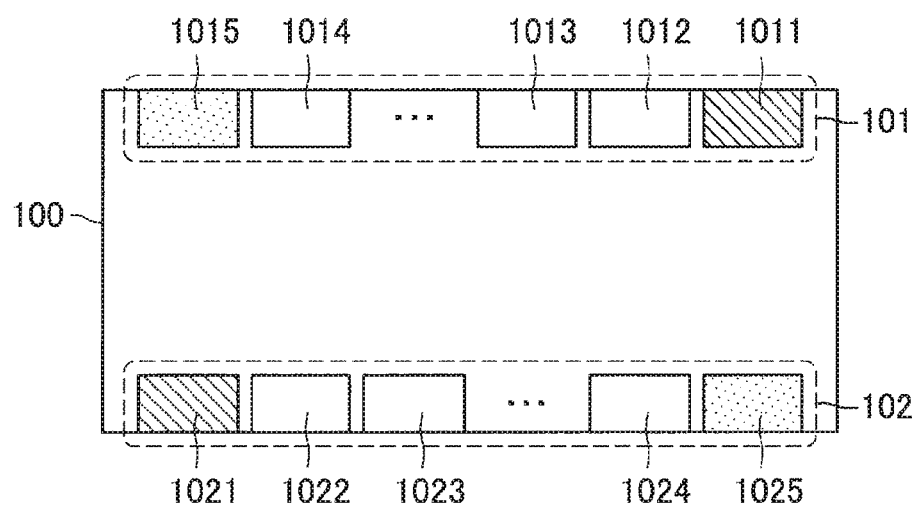
FIG. 2 is a diagram illustrating an exemplary electrode structure of the connector receptacle unit.

An electrode group 101 is an electrode group attached to the connector receptacle unit, is connected to an electrode group 201 attached to the connector plug of the optical-electrical composite cable 20, and is used to electrically transmit a relatively low speed signal required for video and audio transmission. An electrode group 102 is an electrode group attached to the connector receptacle unit similarly to the electrode group 101 and is attached at a position point-symmetrical about the center of the connector receptacle unit main body with respect to the electrode group 101. As illustrated in FIG. 2, electrodes 1011 and 1021, electrodes 1012 and 1022, electrodes 1013 and 1023, electrodes 1014 and 1024, and in addition, electrodes 1015 and 1025 are electrode pairs of which the electrodes are positioned at positions point-symmetrical about the center of the connector receptacle unit, and the same function is allocated to each electrode pair.

The description will be continued with reference to FIG. 1 again. An optical fiber connection unit group 103 is an optical fiber connection unit group having an optical-electrical composite connector structure. In this example, as an example, 16 optical fiber connection units are illustrated in total as an optical fiber connection unit group. The optical fiber connection unit group (connection unit group for transmitting optical signals) 103 is used to transmit an ultrahigh-speed signal mainly such as a video signal as an optical signal through an optical fiber at the time of video and audio transmission.

Figure 3:
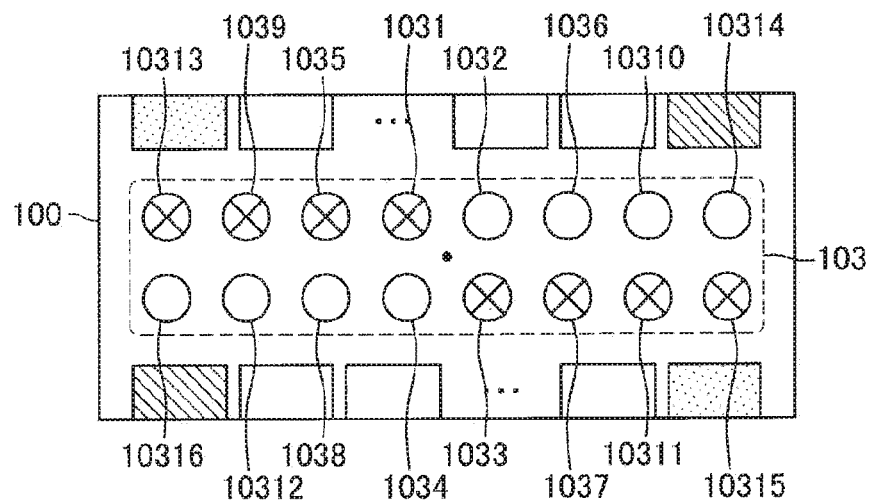
FIG. 3 is a diagram illustrating an exemplary configuration of an optical fiber connection unit group of the connector receptacle unit.

FIG. 3 illustrates details of the optical fiber connection unit group 103. Of the optical fiber connection unit group 103 for transmitting the optical signals, a connection unit group for transmitting optical signals includes connection units for transmitting optical signals 1031, 1033, 1035, 1037, 1039, 10311, 10313, and 10315.

Similarly, a connection unit group for receiving optical signals includes connection units for receiving optical signals 1032, 1034, 1036, 1038, 10310, 10312, 10314 and 10316.

As illustrated in FIGS. 1 and 3, the optical fiber connection unit group 103 has a structure in which the even number of connection units for transmitting the optical signal are positioned at positions point-symmetrical about the center of the connector receptacle unit main body and further has a structure in which the even number of connection units for receiving the optical signals are positioned at positions point-symmetrical about the center of the connector receptacle unit main body. With such a structure, when the connector plug of the optical-electrical composite cable 20 is connected to the connector receptacle unit, it is possible to connect signals in both cases where the connector plug faces upward and downward.

The description will be continued with reference to FIG. 1 again. A voltage generator 104 has a function for generating a voltage and supplies a certain level of voltage to the electrode 1011 of the electrode group 101 of the connector receptacle unit 100 and the electrode 1021 which is a symmetrical electrode of the electrode 1011. A voltage detector 105 has a function for detecting a voltage and is connected to the electrode 1015 of the electrode group 101 of the connector receptacle unit 100. Furthermore, the voltage detector 105 monitors whether the certain level of voltage is supplied to the electrode 1015. A voltage detector 106 has a function for detecting a voltage and is connected to the electrode 1025 of the electrode group 102 of the connector receptacle unit 100. Furthermore, the voltage detector 106 monitors whether the certain level of voltage is supplied to the electrode 1025.

Figure 4:
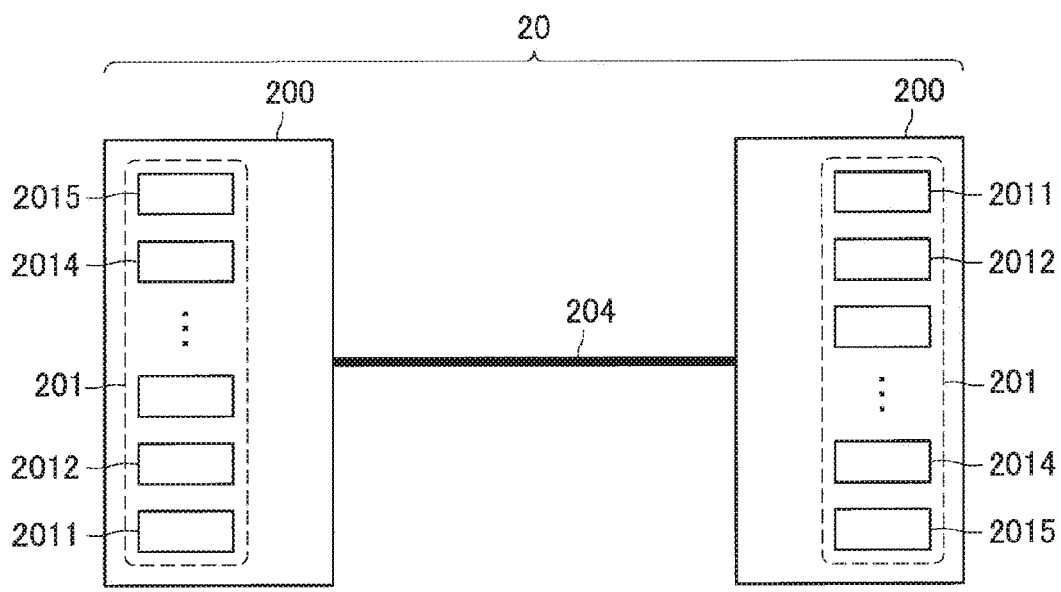
FIG. 4 is a diagram illustrating an exemplary configuration of an optical-electrical composite cable.

FIG. 4 is a diagram illustrating an exemplary configuration of the optical-electrical composite cable 20 according to the first embodiment. The connector plugs 200 are arranged at both ends of the optical-electrical composite cable 20. The connector plug 200 is engaged with the connector receptacle unit 100 included in the transmission device so as to transmit an electrical signal and an optical signal via the electrode group 201 and an optical fiber connection unit group 203. A cable 204 includes an optical fiber group which connects the optical fiber connection unit groups 203 of the connector plugs 200 (FIG. 4) arranged at both ends of the optical-electrical composite cable 20 and a metal wire group which connects between the electrode groups 201 of the connector plugs 200.

Figure 5:
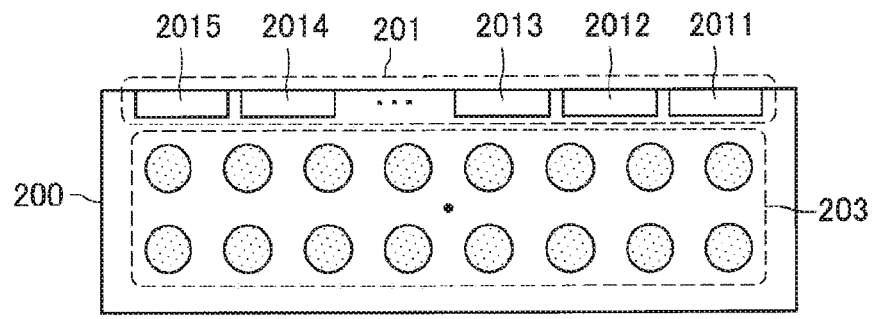
FIG. 5 is a diagram illustrating a configuration of a connector plug of the optical-electrical composite cable.

FIG. 5 illustrates a structure of the connector plug 200 of the optical-electrical composite cable 20 viewed from the connection surface of the connector plug 200. The electrode group 201 is an electrode group attached on a top surface of the connector plug 200, and each of electrodes 2011, 2012, 2013, 2014, and 2015 indicates a single electrode. As illustrated in FIG. 4, the electrode group 201 attached to the connector plug 200 is arranged on the same surface of each of the connector plugs 200 at both ends of the optical-electrical composite cable 20.

Furthermore, the electrodes 2011, 2012, 2013, 2014, and 2015 of the electrode groups 201 at both ends of the optical-electrical composite cable 20 having the same numbers are connected with the metal wire group of the cable 204. The optical fiber connection unit group 203 is arranged to be paired with the connector receptacle unit in this example.

Figure 6:
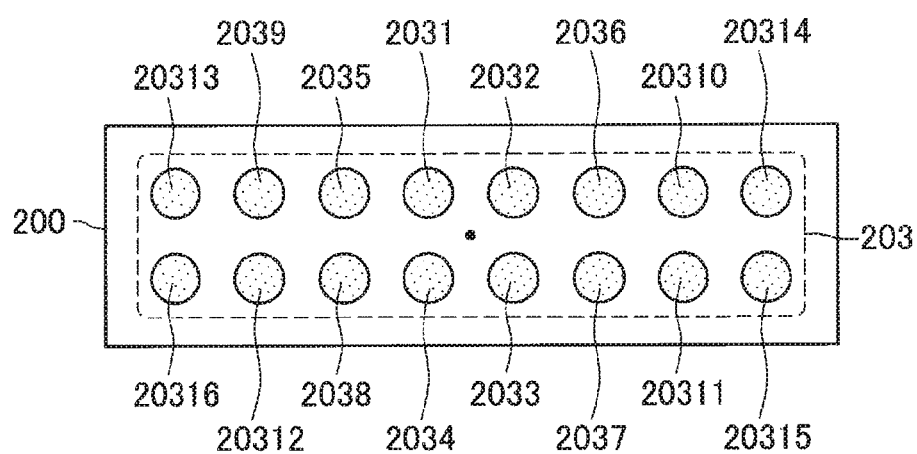
FIG. 6 is a diagram illustrating an exemplary configuration of the optical fiber connection unit group of the optical-electrical composite cable.

FIG. 6 is a diagram illustrating details of the optical fiber connection unit group 203. Each of optical fiber connection units 2031, 2032, 2033, 2034, 2035, 2036, 2037, 2038, 2039, 20310, 20311, 20312, 20313, 20314, 20315, and 20316 is connected to the optical fiber of the cable 204.

The optical fiber connection units 2031 to 20316 included in the optical fiber connection groups 203 of the connector plugs 200 at both ends of the optical-electrical composite cable 20 having the same numbers are connected by the optical fiber group of the cable 204. That is, the optical fiber connection unit 2031 is connected to the optical fiber connection unit 2031, and the optical fiber connection unit 2032 is connected to the optical fiber connection unit 2032. Similarly, regarding the optical fiber connection units 2033 to the optical fiber connection units 20316, the optical fiber connection units having the same numbers are connected to each other.

Figure 7:
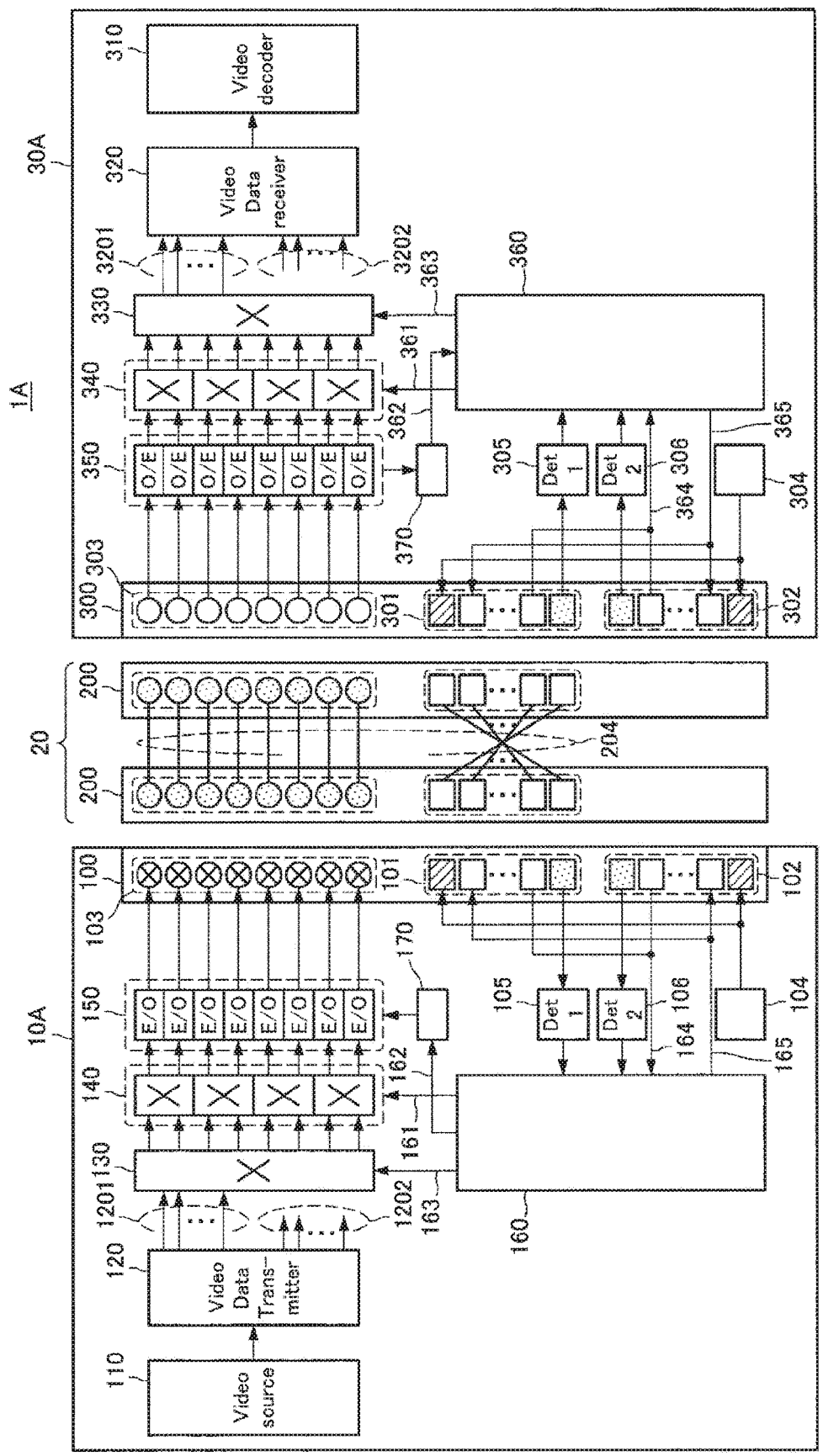
FIG. 7 is a diagram illustrating an overall configuration diagram of a signal transmission system according to the first embodiment.

FIG. 7 is a diagram illustrating an overall configuration diagram of the signal transmission system 1A according to the first embodiment. A transmission device 10A has a transmission function of a video and audio signal. A video signal source 110 is a high-definition video signal source. A video and audio signal transmitter 120 may be a general video and audio signal transmitter, and for example, may be an HDMI transmitter and a Display Port transmitter. A high-speed signal line group 1201 is a high-speed signal line group output from the general video and audio signal transmitter, and for example, may be a TMDS signal line in the HDMI or a Main Link signal line in the Display Port. A low-speed signal line group 1202 is a relatively low-speed signal line group output from the general video and audio signal transmitter, and for example, may be a DDC or CEC in the HDMI or an AUX in the Display Port.

A multiplexer 130 is an m-input-n-output (m<n) multiplexer, and outputs the input high-speed signal line group 1201 to any one of input ports of 2-input-2-output multiplexer group 140 according to an output selection signal 163. The 2-input-2-output multiplexer group 140 includes four multiplexers in this example. Each 2-input-2-output multiplexer exclusively outputs the input two input signal to any one of the two outputs according to a control signal 161.

Figure 8:
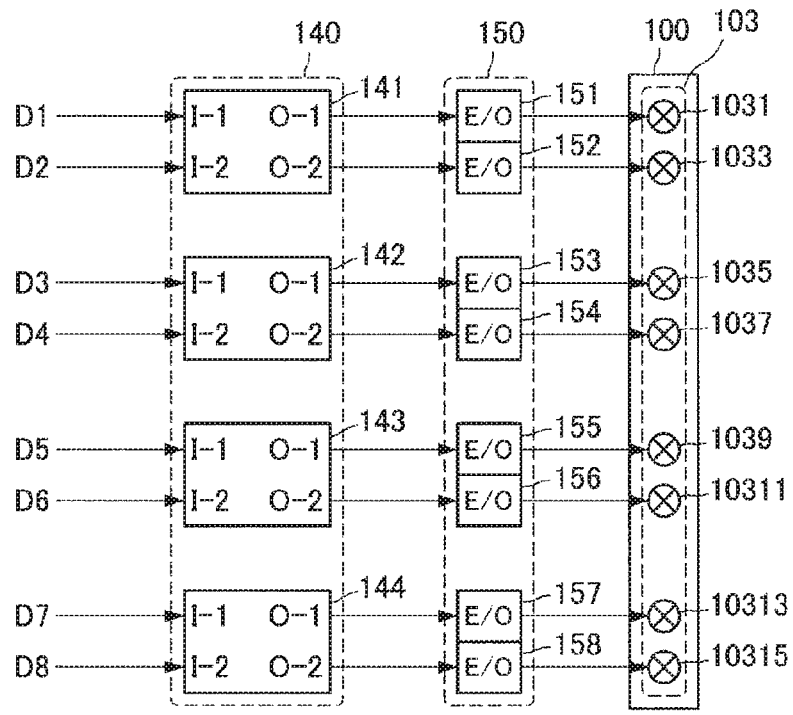
FIG. 8 is a diagram illustrating an exemplary configuration of an optical transmission unit.

The detailed configuration is illustrated in FIG. 8. Two outputs of a 2-input-2-output multiplexer 141 are respectively connected to electro-optical converters (E/O) 151 and 152. The electro-optical converter 151 is connected to the connection unit for transmitting optical signals 1031 of the connector receptacle unit 100. The electro-optical converter 152 is connected to the connection unit for transmitting optical signals 1033 of the connector receptacle unit 100.

The connection units for transmitting optical signals 1031 and 1033 are optical fiber connection units positioned at point-symmetrical positions of the connector receptacle unit 100 as illustrated in FIG. 3. Depending on a connection direction of the connector plugs 200 of the optical-electrical composite cable 20, a connection relation between the optical fiber connection unit group 103 of the connector receptacle unit 100 (including connection units for transmitting optical signals 1031 and 1033) and the optical fiber connection unit group 203 of the connector plug 200 of the optical-electrical composite cable 20 is reversed.

Even in a case where the connection relation between the optical fiber connection unit group 103 of the connector receptacle unit 100 and the optical fiber connection unit group 203 of the connector plug 200 of the optical-electrical composite cable 20 is reversed according to the connection direction of the connector plug 200 of the optical-electrical composite cable 20, the 2-input-2-output multiplexer 141 can return the reversed connection relation to the original connection relation by switching the electro-optical converters 151 and 152 which are output destinations.

Similarly, two outputs of a 2-input-2-output multiplexer 142 are connected to electro-optical converters (E/O) 153 and 154, two outputs of a 2-input-2-output multiplexer 143 are connected to electro-optical converters (E/O) 155 and 156, and two outputs of a 2-input-2-output multiplexer 144 are connected to electro-optical converters (E/O) 157 and 158. The electro-optical converter (E/O) 153 is connected to the connection unit for transmitting optical signals 1035 of the connector receptacle unit 100. The electro-optical converter (E/O) 154 is connected to the connection unit for transmitting optical signals 1037 of the connector receptacle unit 100.

The connection units for transmitting optical signals 1035 and 1037 are optical fiber connection units positioned at point-symmetrical positions of the connector receptacle unit 100 as illustrated in FIG. 3. Depending on the connection direction of the connector plugs 200 of the optical-electrical composite cable 20, a connection relation between the optical fiber connection unit group 103 of the connector receptacle unit 100 (including connection units for transmitting optical signals 1035 and 1037) and the optical fiber connection unit group 203 of the connector plug 200 of the optical-electrical composite cable 20 is reversed.

Therefore, similarly to the 2-input-2-output multiplexer 141, even in a case where the connection relation between the optical fiber connection unit group 103 of the connector receptacle unit 100 and the optical fiber connection unit group 203 of the connector plug 200 of the optical-electrical composite cable 20 is reversed according to the connection direction of the connector plug 200 of the optical-electrical composite cable 20, the 2-input-2-output multiplexer 142 can return the reversed connection relation to the original connection relation by switching the electro-optical converters 153 and 154 which are output destinations.

The electro-optical converter (E/O) 155 is connected to the connection unit for transmitting optical signals 1039 of the connector receptacle unit 100. The electro-optical converter (E/O) 156 is connected to the connection unit for transmitting optical signals 10311 of the connector receptacle unit 100. The connection units for transmitting optical signals 1039 and 10311 are optical fiber connection units positioned at point-symmetrical positions of the connector receptacle unit 100 as illustrated in FIG. 3. Depending on the connection direction of the connector plugs 200 of the optical-electrical composite cable 20, a connection relation between the optical fiber connection unit group 103 of the connector receptacle unit 100 (including connection units for transmitting optical signals 1039 and 10311) and the optical fiber connection unit group 203 of the connector plug 200 of the optical-electrical composite cable 20 is reversed.

Therefore, similarly to the 2-input-2-output multiplexer 141, even in a case where the connection relation between the optical fiber connection unit group 103 of the connector receptacle unit 100 and the optical fiber connection unit group 203 of the connector plug 200 of the optical-electrical composite cable 20 is reversed according to the connection direction of the connector plug 200 of the optical-electrical composite cable 20, the 2-input-2-output multiplexer 143 can return the reversed connection relation to the original connection relation by switching the electro-optical converters 155 and 156 which are output destinations.

The electro-optical converter (E/O) 157 is connected to the connection unit for transmitting optical signals 10313 of the connector receptacle unit 100. The electro-optical converter (E/O) 158 is connected to the connection unit for transmitting optical signals 10315 of the connector receptacle unit 100. The connection units for transmitting optical signals 10313 and 10315 are optical fiber connection units positioned at point-symmetrical positions of the connector receptacle unit 100 as illustrated in FIG. 3. Depending on the connection direction of the connector plugs 200 of the optical-electrical composite cable 20, a connection relation between the optical fiber connection unit group 103 of the connector receptacle unit 100 (including connection units for transmitting optical signals 10313 and 10315) and the optical fiber connection unit group 203 of the connector plug 200 of the optical-electrical composite cable 20 is reversed.

Therefore, similarly to the 2-input-2-output multiplexer 141, even in a case where the connection relation between the optical fiber connection unit group 103 of the connector receptacle unit 100 and the optical fiber connection unit group 203 of the connector plug 200 of the optical-electrical composite cable 20 is reversed according to the connection direction of the connector plug 200 of the optical-electrical composite cable 20, the 2-input-2-output multiplexer 144 can return the reversed connection relation to the original connection relation by switching the electro-optical converters 157 and 158 which are output destinations.

The description will be continued with reference to FIG. 7 again. The connector receptacle unit 100 is the connector receptacle unit main body described in FIG. 1, and the electrode groups 101 and 102 are electrode groups attached to the connector receptacle unit 100 as described above and attached at point-symmetrical positions about the center of the connector receptacle unit main body. Furthermore, as described in FIGS. 1 and 2, the electrode 1011 of the electrode group 101 and the electrode 1021 of the electrode group 102 are connected to the voltage generator 104 which generates a certain level of voltage.

Moreover, as described in FIGS. 1 and 2, the electrode 1015 of the electrode group 101 is connected to the voltage detector 105, and the detection result of the voltage detector 105 is connected to a controller 160. Furthermore, the electrode 1025 of the electrode group 102 is connected to the voltage detector 106, the detection result of the voltage detector 106 is connected to the controller 160.

Furthermore, the electrode 1014 of the electrode group 101 and the electrode 1024 of the electrode group 102 positioned at a position point-symmetrical with respect to the electrode 1014 are connected to the controller 160 so as to transmit a light reception result 164 of an optical signal from a transmission device 30A. Electrodes other than the electrodes 1011, 1021, 1012, 1022, 1014, 1024, 1015, and 1025 of the electrode groups 101 and 102 are connected to the low-speed signal line group 1202 output from the video and audio signal transmitter 120.

The control signal 161 is a control signal for controlling the 2-input-2-output multiplexer group 140 by the controller 160. A control signal 162 is an activation signal, from the controller 160, that activates an electro-optical converter operation controller 170 for sequentially making an electro-optical converter group 150 operate. An output selection signal 163 is a control signal from the controller 160 that controls an input/output relation of the m-input-n-output (m<n) multiplexer 130. The controller 160 is a controller that performs connection control.

The optical-electrical composite cable 20 is the optical-electrical composite cable described in FIG. 4.

The transmission device 30A has a reception function of a video and audio signal. A connector receptacle unit 300 is the same as the connector receptacle unit 100 described in FIG. 1. Furthermore, similarly, electrode groups 301 and 302 are respectively the same as the electrode groups 101 and 102 described in FIG. 1. Moreover, a voltage generator 304 is the same as the voltage generator 104 and is connected to an electrode 1011 of the electrode group 301 and an electrode 1021 of the electrode group 302.

A voltage detector 305 is the same as the voltage detector 105 and is connected to an electrode 1015 of the electrode group 301, and the detection result of the voltage detector 305 is connected to a controller 360. An electrode 1025 of the electrode group 302 is connected to a voltage detector 306, the detection result of the voltage detector 306 is connected to the controller 360. An electrode 1012 of the electrode group 301 and an electrode 1022 of the electrode group 302 are connected to a light reception result 365 of an optical-electrical decoder output from the controller 360.

An optical fiber connection unit group 303 has a function for receiving light of the connector receptacle unit 300 and is the same as the optical fiber connection unit group 103 illustrated in FIG. 1. As illustrated in FIG. 3, connection units for receiving optical signals 1032, 1034, 1036, 1038, 10310, 10312, 10314, and 10316 are arranged to be point-symmetrical about the center of the connector receptacle unit. The optical fiber connection unit group 303 is connected to an optical-electric converter group 350 connected to a subsequent stage. An electrical signal which has been photoelectrically converted by the optical-electric converter group 350 is input to a 2-input-2-output multiplexer group 340.

Figure 9:
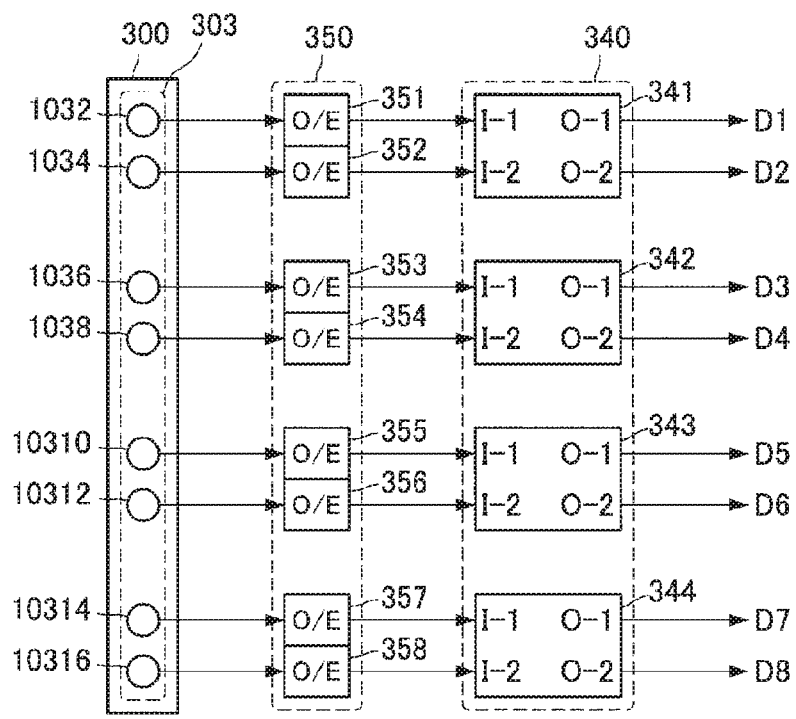
FIG. 9 is a diagram illustrating an exemplary configuration of an optical reception unit.

The detailed structure is illustrated in FIG. 9. The connection units for receiving optical signals 1032 and 1034 which are positioned at positions point-symmetrical about the center of the connector receptacle unit of the optical fiber connection unit group 303 are respectively connected to optical-electric converters 351 and 352. Each of the optical-electric converters 351 and 352 is connected to a 2-input-2-output multiplexer 341, and a light reception signal is converted into the electrical signal and input to the multiplexer.

The connection units for receiving optical signals 1032 and 1034 are positioned at positions point-symmetrical about the center of the connector receptacle unit of the optical fiber connection unit group 303. Depending on a connection direction of the connector plugs 200 of the optical-electrical composite cable 20, a connection relation between the optical fiber connection unit group 303 of the connector receptacle unit 300 (including connection units for receiving optical signals 1032 and 1034) and the optical fiber connection unit group 203 of the connector plug 200 of the optical-electrical composite cable 20 is reversed.

Therefore, even in a case where the connection relation between the optical fiber connection unit group 303 of the connector receptacle unit 100 and the optical fiber connection unit group 203 of the connector plug 200 of the optical-electrical composite cable 20 is reversed according to the connection direction of the connector plug 200 of the optical-electrical composite cable 20, the 2-input-2-output multiplexer 341 can return the reversed connection relation to the original connection relation by switching the optical-electric converters 351 and 352 which are input destinations.

Similarly, the connection units for receiving optical signals 1036 and 1038 which are positioned at positions point-symmetrical about the center of the connector receptacle unit of the optical fiber connection unit group 303 are respectively connected to optical-electric converters 353 and 354. Each of the optical-electric converters 353 and 354 is connected to a 2-input-2-output multiplexer group 342, and a light reception signal is converted into the electrical signal and input to the multiplexer.

The connection units for receiving optical signals 10310 and 10312 which are positioned at positions point-symmetrical about the center of the connector receptacle unit of the optical fiber connection unit group 303 are respectively connected to optical-electric converters 355 and 356. Each of the optical-electric converters 355 and 356 is connected to a 2-input-2-output multiplexer group 343, and a light reception signal is converted into the electrical signal and input to the multiplexer.

The connection units for receiving optical signals 10314 and 10316 which are positioned at positions point-symmetrical about the center of the connector receptacle unit of the optical fiber connection unit group 303 are respectively connected to optical-electric converters 357 and 358. Each of the optical-electric converters 357 and 358 is connected to a 2-input-2-output multiplexer group 344, and a light reception signal is converted into the electrical signal and input to each multiplexer.

As in the 2-input-2-output multiplexer 341, even in a case where the connection relation between the optical fiber connection unit group 303 of the connector receptacle unit 100 and the optical fiber connection unit group 203 of the connector plug 200 of the optical-electrical composite cable 20 is reversed according to the connection direction of the connector plug 200 of the optical-electrical composite cable 20, the 2-input-2-output multiplexers 342, 343, and 344 can return the reversed connection relation to the original connection relation by switching output destinations of the 2-input-2-output multiplexers 342, 343, and 344.

The description will be continued with reference to FIG. 7 again. In the 2-input-2-output multiplexer group 340 including the 2-input-2-output multiplexers 341, 342, 343, and 344, outputs of the respective multiplexers are connected to n input ports of an n-input-m-output (m<n) multiplexer 330. The output of the n-input-m-output (m<n) multiplexer 330 is respectively connected to a high-speed signal line group 3201 of a video and audio signal receiver 320. The video and audio signal receiver 320 may be, for example, an HDMI receiver and may be a Display Port receiver, and each of the high-speed signal line group 3201 may be a TMDS signal or a Main Link signal.

A relatively low speed signal line group 3202 such as CEC/DDC, AUX, and the like is connected to an electrode other than the electrodes 1011, 1021, 1012, 1022, 1014, 1024, 1015, and 1025 of the electrode groups 301 and 302 and is input to the video and audio signal receiver 320. A video and audio signal which has been demodulated by the video and audio signal receiver 320 is input to a video and audio signal decoder 310 and is finally output as a video and audio signal.

The controller 360 is a controller that performs connection control. The control signal 361 is a control signal for controlling the 2-input-2-output multiplexer group 340 by the controller 360. A light reception result 362 is a signal which is output from an integrator 370 of the light reception results from the optical-electric converter group 350 and sequentially indicates the light reception result from each optical-electric converter and is input to the controller 360. A control signal 363 is a control signal from the controller 360 that controls an input/output relation of the n-input-m-output (m<n) multiplexer 330.

(1-2. Description of Operation)

Subsequently, an exemplary operation of the signal transmission system 1A according to the first embodiment of the present disclosure will be described. As an operation, "connector plug connecting direction detection and optical signal path switching processing (1)" and "effective light signal path confirmation and optical signal path switching processing (2)" will be sequentially described. First, the "connector plug connecting direction detection and optical signal path switching processing (1)" will be described.

In a case where the connector receptacle unit 100 of the transmission device 10A is connected to the connector plug 200 of the optical-electrical composite cable 20 and the connector receptacle unit 300 of the transmission device 30A is connected to another connector plug 200 of the optical-electrical composite cable 20, there are cases of four kinds of connections depending on the connection direction of the connector plugs 200. The respective cases are illustrated in FIGS. 10A, 10B, 11A, 11B, 12A, 12B, 13A, and 13B.

First, a connection relation and a signal path of the 2-input-2-output multiplexer group 140 of the transmission device 10A, the electro-optical converter group 150, the optical fiber connection unit group 103 of the connector receptacle unit 100, the optical-electrical composite cable 20, the optical fiber connection unit group 303 of the connector receptacle unit 300 of the transmission device 30A, the optical-electric converter group 350, and the 2-input-2-output multiplexer group 340 in a case where the connector receptacle unit 100 of the transmission device 10A is connected to the connector plug 200 of the optical-electrical composite cable 20 facing upward and the connector receptacle unit 300 of the transmission device 30A is connected to the another connector plug 200 of the optical-electrical composite cable 20 facing upward are illustrated in FIG. 10A.

For example, a signal D1 of the transmission device 10A is input to an input I-1 of the multiplexer 141, and an output O-1 of the multiplexer 141 is selected and output. In addition, the signal D1 is input to the connection unit for receiving optical signals 1032 of the transmission device 30A via the electro-optical converter 151, the connection unit for transmitting optical signals 1031, and the optical fiber connection units 2032 of the optical-electrical composite cable 20. Moreover, the signal D1 is input to the optical-electric converter 351 and the input I-1 of the multiplexer 341, and the output O-1 of the multiplexer 341 is selected and output. This indicates that the signal D1 of the transmission device 10A is correctly transmitted to the signal D1 of the transmission device 30A.

Similarly, regarding other signals D2 to D8, signal paths from the transmission device 10A to the transmission device 30A are illustrated.

In a case of this connection state, the electrodes 1011 and 1015 of the electrode group 101 of the connector receptacle unit 100 of the transmission device 10A are respectively connected to the electrodes 2015 and 2011 of the electrode group 201 of the connector plug 200 of the optical-electrical composite cable 20. At the same time, the electrodes 1011 and 1015 of the electrode group 101 of the connector receptacle unit 300 of the transmission device 30A are respectively connected to the electrodes 2015 and 2011 of the electrode group 201 of the connector plug 200 of the optical-electrical composite cable 20.

Therefore, a voltage from the voltage generator 304 of the transmission device 30A which is the connection destination is supplied to the voltage detector 105 of the transmission device 10A via the optical-electrical composite cable 20, and the voltage detector 105 detects this voltage and transmits the result to the controller 160. On the other hand, since the voltage detector 106 of the transmission device 10A is not connected to the electrode group 102, no voltage is detected, and the voltage detector 106 transmits the result to the controller 160.

With this operation, the controller 160 determines that the connector plug is upwardly connected and performs control by the control signal 161 so that the input I-1 is connected to the output O-1 and the input I-2 is connected to the output O-2 regarding the inputs and outputs of the multiplexers 141, 142, 143, and 144 of the 2-input-2-output multiplexer group 140.

At the same time, a voltage from the voltage generator 104 of the transmission device 10A which is the connection destination is supplied to the voltage detector 305 of the transmission device 30A via the optical-electrical composite cable 20, and the voltage detector 305 detects this voltage and transmits the result to the controller 360. On the other hand, since the voltage detector 306 of the transmission device 30A is not connected to the electrode group 302, no voltage is detected, and the voltage detector 306 transmits the result to the controller 360.

With this operation, the controller 360 determines that the connector plug is upwardly connected and performs control by the control signal 361 so that the input I-1 is connected to the output O-1 and the input I-2 is connected to the output O-2 regarding the inputs and outputs of the multiplexers 341, 342, 343, and 344 of the 2-input-2-output multiplexer group 340.

With this operation, as illustrated in FIG. 10B, a correct transmission path from the transmission device 10A to the transmission device 30A is established.

Furthermore, a connection relation and a signal path of the 2-input-2-output multiplexer group 140 of the transmission device 10A, the electro-optical converter group 150, the optical fiber connection unit group 103 of the connector receptacle unit 100, the optical-electrical composite cable 20, the optical fiber connection unit group 303 of the connector receptacle unit 300 of the transmission device 30A, the optical-electric converter group 350, and the 2-input-2-output multiplexer group 340 in a case where the connector receptacle unit 100 of the transmission device 10A is connected to the connector plug 200 of the optical-electrical composite cable 20 as facing downward and the connector receptacle unit 300 of the transmission device 30A is connected to the another connector plug 200 of the optical-electrical composite cable 20 as facing upward are illustrated in FIG. 11A.

In this case, the connection between the optical fiber connection unit group 103 of the connector receptacle unit 100 of the transmission device 10A and the optical fiber connection unit group 203 of the connector plug 200 of the optical-electrical composite cable 20 is different from that in a case of upward connection. That is, the connection unit for transmitting optical signals 1031 and the optical fiber connection unit 2034, the connection unit for transmitting optical signals 1033 and the optical fiber connection unit 2032, the connection unit for transmitting optical signals 1035 and the optical fiber connection unit 2038, the connection unit for transmitting optical signals 1037 and he optical fiber connection unit 2036, the connection unit for transmitting optical signals 1039 and the optical fiber connection unit 20312, the connection unit for transmitting optical signals 10311 and the optical fiber connection unit 20310, the connection unit for transmitting optical signals 10313 and the optical fiber connection unit 20316, and the connection unit for transmitting optical signals 10315 and the optical fiber connection unit 20314 are connected to each other.

This indicates that the signal D1 of the transmission device 10A is erroneously transmitted to the signal D2 of the transmission device 30A in a state illustrated in FIG. 10A. Similarly, the other signals D2 to D8 are erroneously transmitted from the transmission device 10A to the transmission device 30A. By operating the 2-input-2-output multiplexer, this situation is improved.

In a case of this connection state, the electrodes 1021 and 1025 of the electrode group 102 of the connector receptacle unit 100 of the transmission device 10A are respectively connected to the electrodes 2015 and 2011 of the electrode group 201 of the connector plug 200 of the optical-electrical composite cable 20. At the same time, the electrodes 1011 and 1015 of the electrode group 101 of the connector receptacle unit 300 of the transmission device 30A are respectively connected to the electrodes 2015 and 2011 of the electrode group 201 of the connector plug 200 of the optical-electrical composite cable 20.

Therefore, a voltage from the voltage generator 304 of the transmission device 20A which is a connection destination is supplied to the voltage detector 106 of the transmission device 10A via the optical-electrical composite cable 20, and the voltage detector 106 detects this voltage and transmits the result to the controller 160. On the other hand, since the voltage detector 105 of the transmission device 10A is not connected to the electrode group 101, no voltage is detected, and the voltage detector 105 transmits the result to the controller 160.

With this operation, the controller 160 determines that the connector plug is downwardly connected and performs control by the control signal 161 so that the input I-1 is connected to the output O-2 and the input I-2 is connected to the output O-1 regarding the inputs and outputs of the multiplexers 141, 142, 143, and 144 of the 2-input-2-output multiplexer group 140.

At the same time, a voltage from the voltage generator 104 of the transmission device 10A which is the connection destination is supplied to the voltage detector 305 of the transmission device 30A via the optical-electrical composite cable 20, and the voltage detector 305 detects this voltage and transmits the result to the controller 360. On the other hand, since the voltage detector 306 of the transmission device 30A is not connected to the electrode group 302, no voltage is detected, and the voltage detector 306 transmits the result to the controller 360.

With this operation, the controller 360 determines that the connector plug is upwardly connected and performs control by the control signal 361 so that the input I-1 is connected to the output O-1 and the input I-2 is connected to the output O-2 regarding the inputs and outputs of the multiplexers 341, 342, 343, and 344 of the 2-input-2-output multiplexer group 340.

With this control, as illustrated in FIG. 11B, by returning the signal switch caused by the connector connection direction between the transmission device 10A and the optical-electrical composite cable 20 to the original state (by further switching signals) by operation the 2-input-2-output multiplexer group 140, a correct transmission path from the transmission device 10A to the transmission device 30A is established.

Furthermore, contrary to a case described in FIGS. 11A and 11B, a connection relation and a signal path of the 2-input-2-output multiplexer group 140 of the transmission device 10A, the electro-optical converter group 150, the optical fiber connection unit group 103 of the connector receptacle unit 100, the optical-electrical composite cable 20, the optical fiber connection unit group 303 of the connector receptacle unit 300 of the transmission device 30A, the optical-electric converter group 350, and the 2-input-2-output multiplexer group 340 in a case where the connector receptacle unit 100 of the transmission device 10A is connected to the connector plug 200 of the optical-electrical composite cable 20 facing upward and the connector receptacle unit 300 of the transmission device 30A is connected to the another connector plug 200 of the optical-electrical composite cable 20 facing downward are illustrated in FIG. 12A.

As in the state described in FIG. 11A, this also indicates that the signal D1 of the transmission device 10 is erroneously transmitted to the signal D2 of the transmission device 30 in a state illustrated in FIG. 10A. Similarly, the other signals D2 to D8 are erroneously transmitted from the transmission device 10A to the transmission device 30A. By operating the 2-input-2-output multiplexer, this situation is improved.

In a case of this connection state, the electrodes 1011 and 1015 of the electrode group 101 of the connector receptacle unit 100 of the transmission device 10A are respectively connected to the electrodes 2015 and 2011 of the electrode group 201 of the connector plug 200 of the optical-electrical composite cable 20. At the same time, the electrodes 1011 and 1015 of the electrode group 101 of the connector receptacle unit 300 of the transmission device 30A are respectively connected to the electrodes 2015 and 2011 of the electrode group 201 of the connector plug 200 of the optical-electrical composite cable.

Therefore, a voltage from the voltage generator 304 of the transmission device 30A which is the connection destination is supplied to the voltage detector 105 of the transmission device 10A via the optical-electrical composite cable 20, and the voltage detector 105 detects this voltage and transmits the result to the controller 160. On the other hand, since the voltage detector 106 of the transmission device 10A is not connected to the electrode group 102, no voltage is detected, and the voltage detector 106 transmits the result to the controller 160.

With this operation, the controller 160 determines that the connector plug is upwardly connected and performs control by the control signal 161 so that the input I-1 is connected to the output O-1 and the input I-2 is connected to the output O-2 regarding the inputs and outputs of the multiplexers 141, 142, 143, and 144 of the 2-input-2-output multiplexer group 140.

At the same time, a voltage from the voltage generator 104 of the transmission device 10A which is the connection destination is supplied to the voltage detector 306 of the transmission device 30A via the optical-electrical composite cable 20, and the voltage detector 306 detects this voltage and transmits the result to the controller 360. On the other hand, since the voltage detector 305 of the transmission device 30A is not connected to the electrode group 301, no voltage is detected, and the voltage detector 305 transmits the result to the controller 360.

With this operation, the controller 360 determines that the connector plug is downwardly connected and performs control by the control signal 361 so that the input I-1 is connected to the output O-2 and the input I-2 is connected to the output O-1 regarding the inputs and outputs of the multiplexers 341, 342, 343, and 344 of the 2-input-2-output multiplexer group 340.

With this operation, as illustrated in FIG. 12B, a correct transmission path from the transmission device 10A to the transmission device 30A is established.

Furthermore, a connection relation and a signal path of the 2-input-2-output multiplexer group 140 of the transmission device 10A, the electro-optical converter group 150, the optical fiber connection unit group 103 of the connector receptacle unit 100, the optical-electrical composite cable 20, the optical fiber connection unit group 303 of the connector receptacle unit 300 of the transmission device 30A, the optical-electric converter group 350, and the 2-input-2-output multiplexer group 340 in a case where the connector receptacle unit 100 of the transmission device 10A is connected to the connector plug 200 of the optical-electrical composite cable 20 facing downward and the connector receptacle unit 300 of the transmission device 30A is connected to the another connector plug 200 of the optical-electrical composite cable 20 facing downward are illustrated in FIG. 13A.

In this case, the signal of the transmission device 10A is correctly transmitted to the signal of the transmission device 30A. However, as described above, processing is performed which is the same as the processing when the connector receptacle unit 100 of the transmission device 10A and the optical-electrical composite cable 20 are downwardly connected and the processing when the connector receptacle unit 300 of the transmission device 30A and the connector plug 200 of the optical-electrical composite cable 20 are downwardly connected.

That is, a voltage from the voltage generator 304 of the transmission device 30A which is the connection destination is supplied to the voltage detector 106 of the transmission device 10A via the optical-electrical composite cable 20, and the voltage detector 106 detects this voltage and transmits the result to the controller 160. On the other hand, since the voltage detector 105 of the transmission device 10A is not connected to the electrode group 101, no voltage is detected, and the voltage detector 105 transmits the result to the controller 160.

With this operation, the controller 160 determines that the connector plug is downwardly connected and performs control by the control signal 161 so that the input I-1 is connected to the output O-2 and the input I-2 is connected to the output O-1 regarding the inputs and outputs of the multiplexers 141, 142, 143, and 144 of the 2-input-2-output multiplexer group 140.

Similarly, a voltage from the voltage generator 104 of the transmission device 10A which is the connection destination is supplied to the voltage detector 306 of the transmission device 30A via the optical-electrical composite cable 20, and the voltage detector 306 detects this voltage and transmits the result to the controller 360. On the other hand, since the voltage detector 305 of the transmission device 30A is not connected to the electrode group 301, no voltage is detected, and the voltage detector 305 transmits the result to the controller 360.

With this operation, the controller 360 determines that the connector plug is downwardly connected and performs control by the control signal 361 so that the input I-1 is connected to the output O-2 and the input I-2 is connected to the output O-1 regarding the inputs and outputs of the multiplexers 341, 342, 343, and 344 of the 2-input-2-output multiplexer group 340.

With this operation, as illustrated in FIG. 13B, a correct transmission path from the transmission device 10A to the transmission device 30A is established.

With the above processing, the transmission device 10A and the transmission device 30A can correctly transmit the optical signals without recognizing the connection direction between the other party and the optical-electrical composite cable 20 and regardless of the state of the connection relation between the other party and the optical-electrical composite cable 20.

Subsequently, the "effective light signal path confirmation and optical signal path switching processing (2)" will be described. As described above, in the optical signal transmission, there is a case where a defect occurs in the optical signal transmission due to a defect of an optical device, contamination of dust in an optical fiber connection unit, breaking of an optical fiber, and the like. To prevent the defect, a redundant optical signal path is prepared for the optical signal path required for signal transmission, and the other redundant path is used in a case where a defect occurs in the optical signal path.

An effective signal path confirmation procedure according to the present embodiment will be described with reference to FIGS. 7, 14, and 15. At the time when the connector receptacle unit 100 of the transmission device 10A is connected to the connector plug 200 of the optical-electrical composite cable 20 and the connector receptacle unit 300 of the transmission device 30A is connected to the another connector plug 200 of the optical-electrical composite cable 20, as described above, the voltage detectors 105 and 305 or the voltage detectors 106 and 306 respectively detect the voltages from the voltage generators 104 and 304 via the optical-electrical composite cable 20 and respectively output the results to the controllers 160 and 360.

Figure 14:
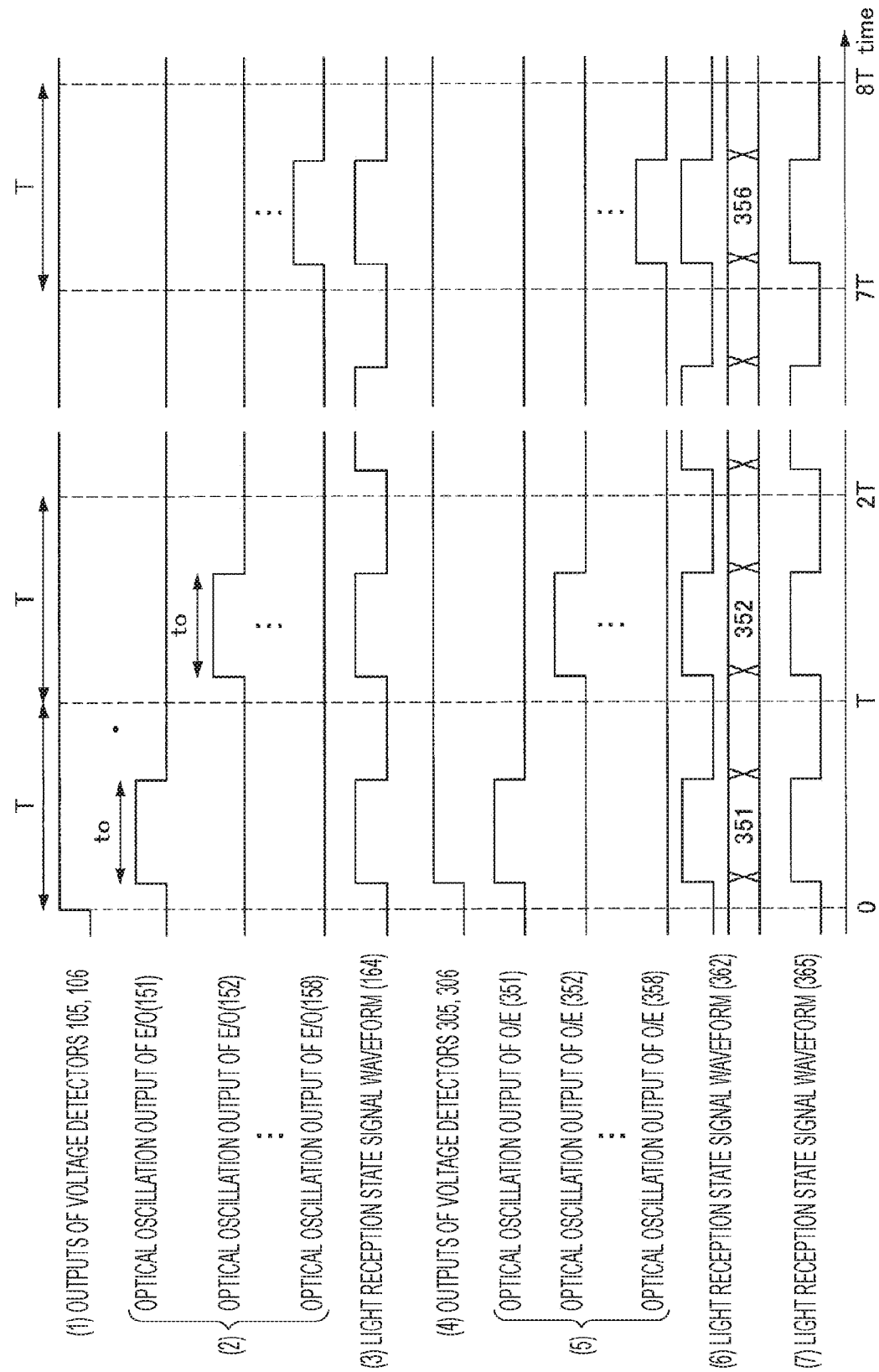
FIG. 14 is a diagram for explaining effective light signal path confirmation in a case where all paths are normal.
Figure 15:
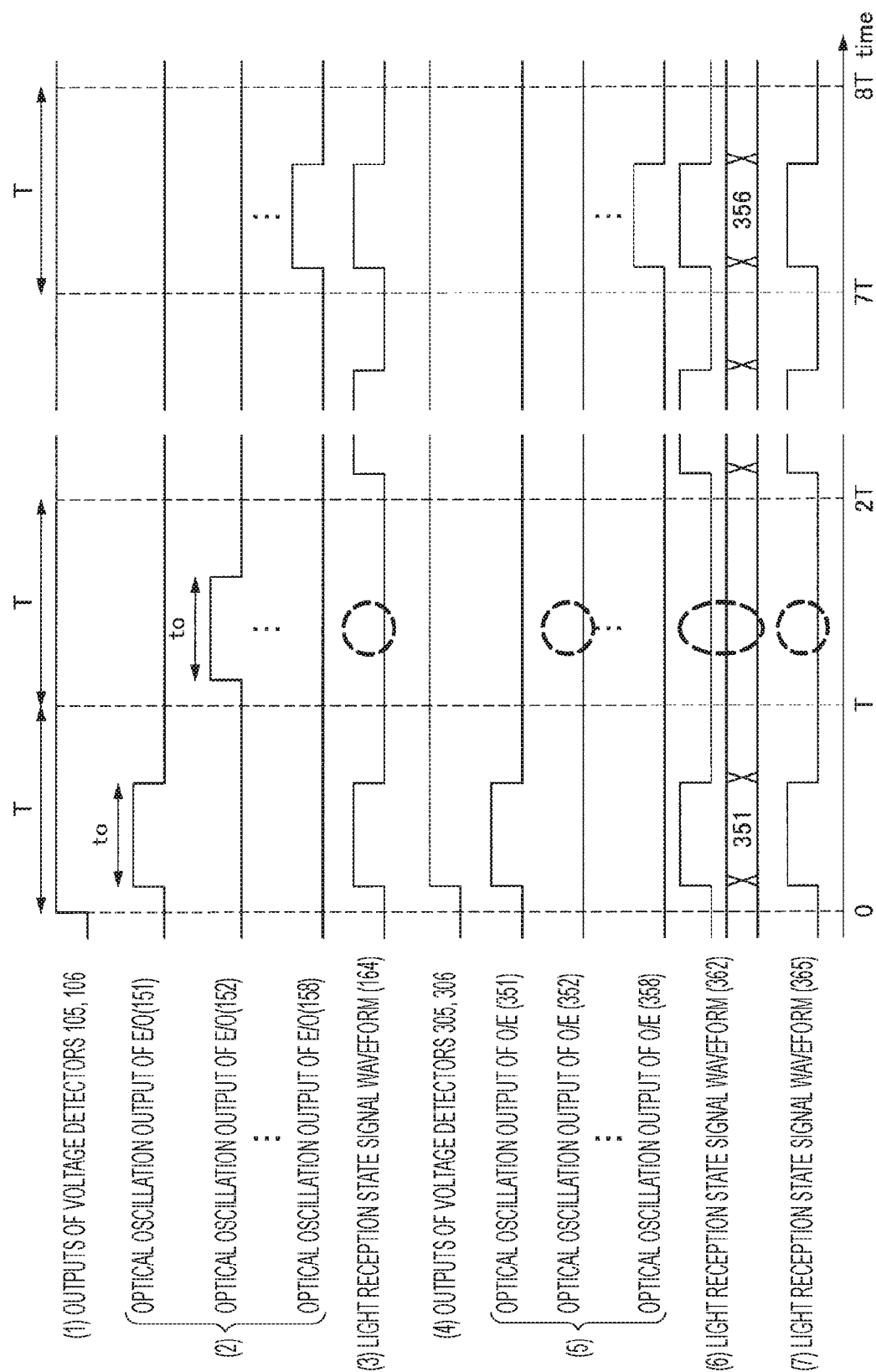
FIG. 15 is a diagram for explaining the effective light signal path confirmation in a case where an abnormality occurs in an optical-electric converter.

The controller 160 of the transmission device 10A activates the electro-optical converter operation controller 170 by the control signal 162 at the time when the voltage detector 105 or 106 detects a voltage equal to or higher than a certain level (time "0" in (1) of FIGS. 14 and 15). The electro-optical converter operation controller 170 activates the electro-optical converter operation controller 170, by the control signal 162, that sequentially makes the electro-optical converters 151, 152, . . . , and 158 of the electro-optical converter group 150 oscillate the optical signal for a certain period of time to (T>to) at each certain time T. With this operation, the electro-optical converters 151, 152, . . . and 158 sequentially oscillate the optical signal for the certain period of time to (T>to) at each certain time T ((2) in FIGS. 14 and 15).

On the other hand, the controller 360 of the transmission device 30A waits for the light reception result 362 from the optical-electric converter group 350 for 8*T (the number of mounted optical-electric converters certain time T) time from the time when the voltage detector 305 or the voltage detector 306 has detected the voltage equal to or higher than a certain level (time "0" in (4) in FIGS. 14 and 15). Each of the optical-electric converters 351, 352, . . . , and 358 receives the optical signal from the optical-electric converter group 350 of the transmission device 10A via the optical-electrical composite cable 20 and sequentially outputs the result obtained by converting the optical signal into the electrical signal to the integrator 370 ((5) in FIG. 14). The light reception signal result of 8*T time obtained by integrating the outputs from the optical-electric converters and a number of the corresponding optical-electric converter (362 in FIG. 7) ((6) in FIG. 14) are input to the controller 360.

The controller 360 determines the effective optical signal path according to the light reception signal result and the number of the corresponding optical-electric converter (362 in FIG. 7). FIG. 14 illustrates that all the optical-electric converters 351, 352, . . . , and 358 can receive light, and it can be determined that all the optical-electric converters 351, 352, . . . , and 358 are effective optical signal paths. On the other hand, in the example illustrated in FIG. 15, the light reception output of the optical-electric converter 352 is not output at a predetermined time for some reason ((5) in FIG. 15). As a result, the light reception signal result of 8*T time obtained by integrating the outputs from the optical-electric converters including the optical-electric converter 352 with no output and a number of the corresponding optical-electric converter ((6) in FIG. 15) are input to the controller 360.

The controller 360 can determine that the optical-electric converters 351, 353, . . . , and 358 except for the optical-electric converter 352 are effective optical signal paths. Moreover, the controller 360 outputs the light reception result 365 ((7) in FIGS. 14 and 15). The light reception result 365 is input to the controller 160 of the transmission device 10A via the optical-electrical composite cable 20. The controller 160 determines an effective optical signal path according to the light reception result 164 ((3) in FIGS. 14 and 15) input from the transmission device 30A each time when T hours passes from the time when the voltage detector 105 or the voltage detector 106 detects the voltage equal to or higher than a certain level (time "0" in (1) in FIGS. 14 and 15) as a starting point. That is, since the electro-optical converter is oscillated each T hours, if the light reception result 164 input from the transmission device 30 indicates lighting (high level) during the oscillation period, it is determined that the electro-optical converter is effective.

The example illustrated in FIG. 14 indicates that all the electro-optical converters 151, 152, . . . , and 158 are effective. On the other hand, in the example illustrated in FIG. 15, it can be determined that the electro-optical converters 151, 153, . . . , and 158 except for the electro-optical converter 152 are the effective optical signal paths.

The controller 160 of the transmission device 10A controls the input/output relation of the m-input-m-output (m<n) multiplexer 130 by the control signal 163 after the determination regarding the effective optical signal path has been completed (on or after 8T hours in FIGS. 14 and 15). If the number of effective optical signal paths is equal to or more than m with respect to m input high-speed signal lines, the controller 160 sequentially connects a first to m-th input high-speed signal lines to a first to m-th outputs of the multiplexer. On the other hand, the controller 160 makes connection without using and as skipping the output of the ineffective optical signal path.

For example, in the example illustrated in FIG. 7, in a case where the video and audio signal transmitter 120 is an HDMI, the high-speed signal line group 1201 includes four signals in total including three TMDS signals and a single TMDS clock signal. As illustrated in FIG. 14, in a case where all the optical signal paths are effective, the controller 160 performs control so as to connect the input I-1 to the output O-1, the input I-2 to the output O-2, the input I-3 to the output O-3, and the input I-4 to the output O-4 of the 4-input-8-output multiplexer 130 illustrated in FIG. 16.

Figure 16:
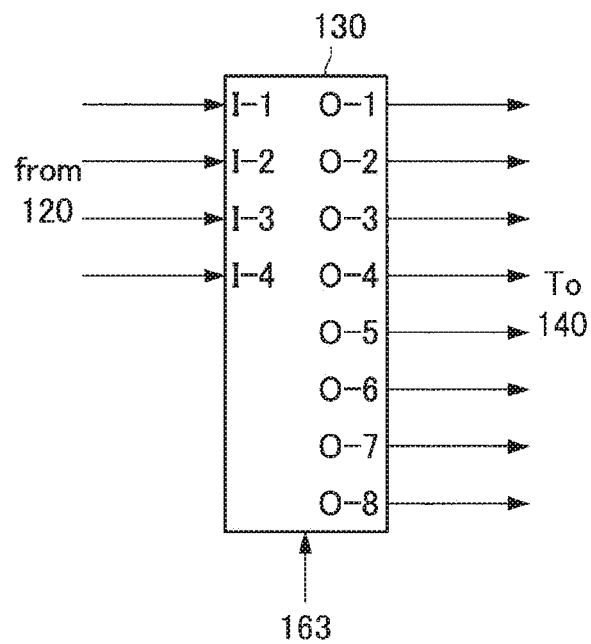
FIG. 16 is a diagram illustrating an example of a 4-input-8-output multiplexer.

As illustrated in FIG. 15, in a case where the path of the electro-optical converter 152 is not effective, the controller 160 performs control so as to connect the input I-1 to the output O-1, the input I-2 to the output O-3, the input I-3 to the output O-4, and the input I-4 to the output O-5 of the 4-input-8-output multiplexer 130 illustrated in FIG. 16.

Similarly, the controller 360 of the transmission device 30A controls the input/output relation of the n-input-m-output (m<n) multiplexer 330 by the control signal 363 after the determination regarding the effective optical signal path has been completed (on or after 8T hours in FIGS. 14 and 15). If the number of effective optical signal paths is equal to or more than m with respect to m output high-speed signal lines, the controller 360 sequentially connects a first to m-th input signals to the first to m-th outputs of the multiplexer. The controller 360 makes connection without using and as skipping the output of the ineffective optical signal path.

Figure 17:
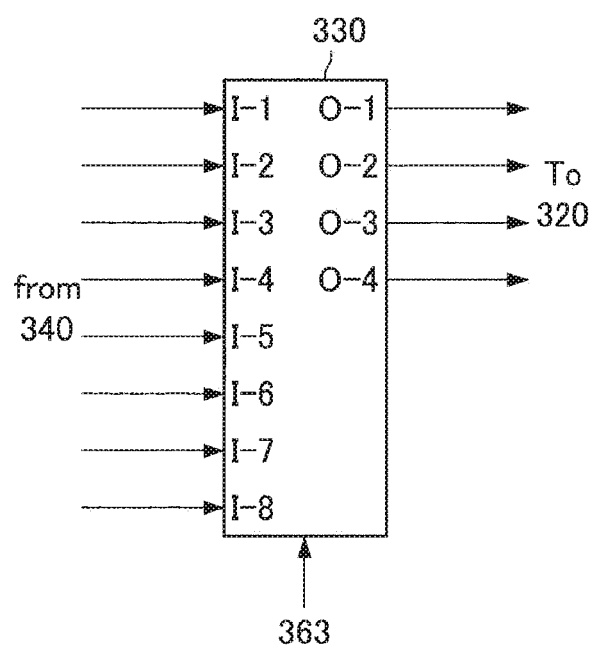
FIG. 17 is a diagram illustrating an example of an 8-input-4-output multiplexer.

As illustrated in FIG. 14, in a case where all the optical signal paths are effective, the controller 360 performs control so as to connect the input I-1 to the output O-1, the input I-2 to the output O-2, the input I-3 to the output O-3, and the input I-4 to the output O-4 of the 8-input-4-output multiplexer 330 illustrated in FIG. 17. As illustrated in FIG. 15, in a case where the path of the optical-electric converter 352 is not effective, the controller 360 performs control so as to connect the input I-1 to the output O-1, the input I-3 to the output O-2, the input I-4 to the output O-3, and the input I-5 to the output O-4 of the 8-input-4-output multiplexer 330 illustrated in FIG. 16.

With such an operation, even in a case where the optical signal path has a defect, the optical signal can be normally transmitted by using only the effective signal paths and without using the signal path having the defect.

2. SECOND EMBODIMENT

Figure 18:
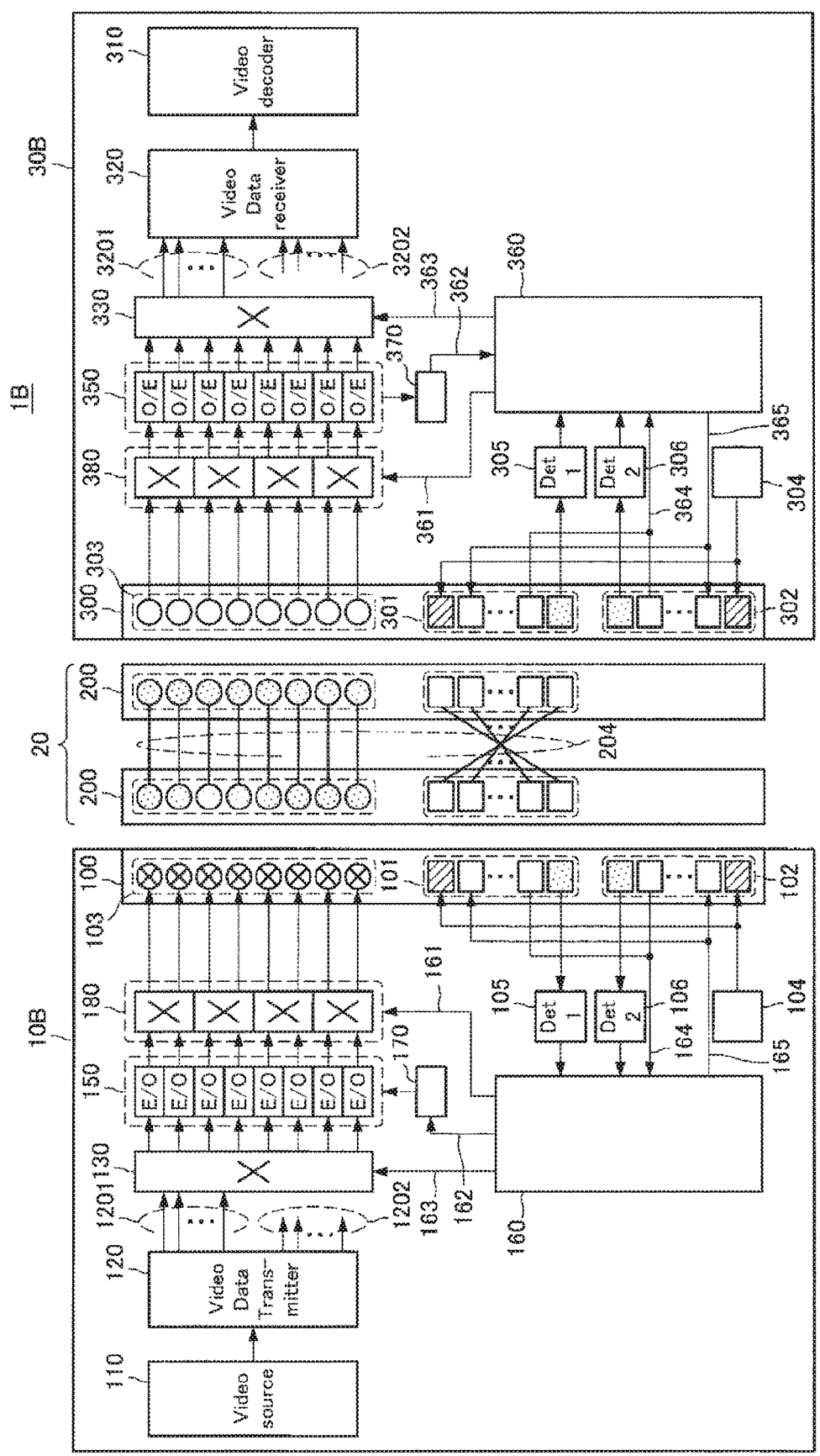
FIG. 18 is a diagram illustrating an overall configuration diagram of a signal transmission system according to a second embodiment.

Subsequently, a second embodiment will be described.
(2-1. Configuration of Signal Transmission System)
An exemplary configuration of a signal transmission system 1B according to the second embodiment will be described. FIG. 18 is an overall configuration diagram of the signal transmission system 1B according to the second embodiment. As illustrated in FIG. 18, whereas the signal transmission system 1A illustrated in FIG. 7 includes the transmission device 10A and the transmission device 30A, the signal transmission system 1B according to the second embodiment includes a transmission device 10B and a transmission device 30B.

In the example illustrated in FIG. 7, the 2-input-2-output multiplexer group 140 of the transmission device 10A and the 2-input-2-output multiplexer group 340 of the transmission device 30A perform switching by using the electrical signals. On the other hand, in the example illustrated in FIG. 18, a 2-input-2-output multiplexer group 180 of the transmission device 10B and a 2-input-2-output multiplexer group 380 of the transmission device 30B perform switching by optical signals after photoelectric conversion or optical signals before photoelectric conversion. In the example illustrated in FIG. 18, other components are similar to those in the example illustrated in FIG. 7.

3. CONCLUSION

As described above, according to the embodiments of the present disclosure, the transmission device (transmitting device) 10A is provided which includes the connector receptacle unit 100 connected to the optical-electrical composite cable 20, and the connector receptacle unit 100 includes the electrode group 101, the electrode group 102 provided at the position rotated from the electrode group 101 by 180 degrees about the center of the main body of the connector receptacle unit 100 as a reference, the first connection unit group for transmitting optical signals, and the second connection unit group for transmitting optical signals provided at the position rotated from the first connection unit group for transmitting optical signals by 180 degrees about the center of the main body of the connector receptacle unit 100 as a reference.

According to the above configuration, reliability in the light transmission and convenience at the time of connecting the transmission device to the cable can be improved with a simple circuit configuration.

Preferred embodiments of the present disclosure have been described in detail above with reference to the drawings. However, the technical scope of the present disclosure is not limited to the embodiments. It is obvious that a person who has normal knowledge in the technical field of the present disclosure can arrive at various variations and modifications in the scope of the technical ideas described in claims. It is understood that the variations and modifications naturally belong to the technical scope of the present disclosure.

For example, respective functional blocks provided in the transmission device (transmitting device) 10 may be mounted on separated integrated circuits (IC), or any combination of the functional blocks may be mounted on the same IC. Furthermore, for example, respective functional blocks provided in the transmission device (reception device) 30 may be mounted on separated Integrated Circuits (IC), or any combination of the functional blocks may be mounted on the same IC.

Furthermore, the effects described in the present specification are merely illustrative or exemplary and are not limited. That is, the technology according to the present disclosure may exhibit effects obvious to those skilled in the art from the description in the present specification together with or instead of the above effects.

Note that the following configuration belongs to the technical scope of the present disclosure.

(1)
A transmitting device including:
a connector receptacle unit connected to an optical-electrical composite cable, in which
the connector receptacle unit includes
a first electrode group,
a second electrode group provided at a position rotated from the first electrode group by 180 degrees about a center of a main body of the connector receptacle unit as a reference,
a first connection unit group for transmitting optical signals, and
a second connection unit group for transmitting optical signals provided at a position rotated from the first connection unit group for transmitting optical signals by 180 degrees about the center of the main body of the connector receptacle unit as a reference.

(2)
The transmitting device according to (1), in which
the first electrode group is connected to a plurality of electrodes of a connector plug of the optical-electrical composite cable in a case where the connector receptacle unit and the connector plug of the optical-electrical composite cable are connected in a first direction.

(3)
The transmitting device according to (2), in which
the second electrode group is connected to the plurality of electrodes of the connector plug of the optical-electrical composite cable in a case where the connector receptacle unit and the connector plug of the optical-electrical composite cable are connected in a second direction which is opposite to the first direction.

(4)
The transmitting device according to (3), in which
the first connection unit group for transmitting optical signals is connected to a first optical fiber group of the optical-electrical composite cable in a case where the connector receptacle unit and the connector plug of the optical-electrical composite cable are connected in the first direction.

(5)
The transmitting device according to (4), in which the first connection unit group for transmitting optical signals is connected to a second optical fiber group of the optical-electrical composite cable in a case where the connector receptacle unit and the connector plug of the optical-electrical composite cable are connected in the second direction.

(6)
The transmitting device according to any one of (1) to (5), in which the first electrode group includes a first voltage detecting electrode, the second electrode group includes a second voltage detecting electrode provided at a position rotated from the first voltage detecting electrode by 180 degrees about the center of the main body of the connector receptacle unit as a reference, and the transmitting device further includes a first voltage detection unit configured to detect a voltage applied to the first voltage detecting electrode via the optical-electrical composite cable by a reception device; and a second voltage detection unit configured to detect a voltage applied to the second voltage detecting electrode via the optical-electrical composite cable by the reception device.

(7)

The transmitting device according to (6), further including:

a controller configured to perform control so as to switch an input signal to the first connection unit group for transmitting optical signals and an input signal to the second connection unit group for transmitting optical signals in a case where a predetermined level of voltage applied to the first voltage detecting electrode is detected and in a case where the predetermined level of voltage applied to the second voltage detecting electrode is detected.

(8)

The transmitting device according to (6), further including:

a controller configured to control oscillation of an optical signal by an electro-optical converter connected to the first connection unit group for transmitting optical signals and the second connection unit group for transmitting optical signals in a case where a predetermined level of voltage applied to the first voltage detecting electrode or the second voltage detecting electrode is detected.

(9)

The transmitting device according to (8), in which the controller controls a signal path to be used on the basis of effectiveness of each of the first connection unit group for transmitting optical signals and the second connection unit group for transmitting optical signals determined as a result of the oscillation.

(10)

The transmitting device according to any one of (1) to (6), in which in the transmitting device, the first electrode group includes a first voltage applying electrode, and the second electrode group includes a second voltage applying electrode provided at a position rotated from the first voltage applying electrode by 180 degrees about the center of the main body of the connector receptacle unit as a reference, and the transmitting device further includes:

a voltage generation unit configured to apply a predetermined level of voltage to the first voltage applying electrode and the second voltage applying electrode.

(11)

A reception device including:

a connector receptacle unit connected to an optical-electrical composite cable, in which the connector receptacle unit includes a first electrode group, a second electrode group provided at a position rotated from the first electrode group by 180 degrees about a center of a main body of the connector receptacle unit as a reference, a first connection unit group for receiving optical signals, and a second connection unit group for receiving optical signals provided at a position rotated from the first connection unit group for receiving optical signals by 180 degrees about the center of the main body of the connector receptacle unit as a reference.

(12)

The reception device according to (11), in which the first electrode group is connected to a plurality of electrodes of a connector plug of the optical-electrical composite cable in a case where the connector receptacle unit and the optical-electrical composite cable are connected in a first direction.

(13)

The reception device according to (12), in which the second electrode group is connected to the plurality of electrodes of the connector plug of the optical-electrical composite cable in a case where the connector receptacle unit and the optical-electrical composite cable are connected in a second direction opposite to the first direction.

(14)

The reception device according to (13), in which the first connection unit group for receiving optical signals is connected to a first optical fiber group of the optical-electrical composite cable in a case where the connector receptacle unit and the connector plug of the optical-electrical composite cable are connected in the first direction.

(15)

The reception device according to (14), in which the first connection unit group for receiving optical signals is connected to a second optical fiber group of the optical-electrical composite cable in a case where the connector receptacle unit and the connector plug of the optical-electrical composite cable are connected in the second direction.

(16)

The reception device according to any one of (11) to (15), in which the first electrode group includes a first voltage detecting electrode, the second electrode group includes a second voltage detecting electrode provided at a position rotated from the first voltage detecting electrode by 180 degrees about the center of the main body of the connector receptacle unit as a reference, and the reception device further includes:

a first voltage detection unit configured to detect a voltage applied to the first voltage detecting electrode via the optical-electrical composite cable by a transmitting device; and a second voltage detection unit configured to detect a voltage applied to the second voltage detecting electrode via the optical-electrical composite cable by the transmitting device.

(17)

The reception device according to (16), further including:

a controller configured to perform control so as to switch a signal output destination from the first connection unit group for receiving optical signals and a signal output destination from the second connection unit group for receiving optical signals in a case where a predetermined level of voltage applied to the first voltage detecting electrode is detected and in a case where the predetermined level of voltage applied to the second voltage detecting electrode is detected.

(18)

The reception device according to (16), further including: a controller configured to determine effectiveness of each of the first connection unit group for receiving optical signals and the second connection unit group for receiving optical signals on the basis of light reception results by an optical-electric converter group connected to the first connection unit group for receiving optical signals and the second connection unit group for receiving optical signals in a case where a predetermined level of voltage applied to the first voltage detecting electrode or the second voltage detecting electrode is detected.

(19)

The reception device according to (18), in which the controller controls a signal path to be used on the basis of the effectiveness of each of the first connection unit group for receiving optical signals and the second connection unit group for receiving optical signals.

(20)

The reception device according to any one of (11) to (15), in which in the reception device, the first electrode group includes a first voltage applying electrode, and the second electrode group includes a second voltage applying electrode provided at a position rotated from the first voltage applying electrode by 180 degrees about the center of the main body of the connector receptacle unit as a reference, and the reception device further includes:

a voltage generation unit configured to apply a predetermined level of voltage to the first voltage applying electrode and the second voltage applying electrode.

(21)

An optical-electrical composite cable including:

a transmission-side connector plug connected to a transmitting device, in which the transmission-side connector plug includes a transmission-side electrode group connected to a first electrode group or a second electrode group of a connector receptacle unit of the transmitting device, and an optical fiber group connected to a connection unit group for transmitting optical signals of the connector receptacle unit of the transmitting device.

(22)

The optical-electrical composite cable according to (21), further including:

a reception-side connector plug connected to a reception device, in which the reception-side connector plug includes a reception-side electrode group connected to the first electrode group or the second electrode group of a connector receptacle unit of the reception device, and a metal wire configured to connect the transmission-side electrode group and the reception-side electrode group.

REFERENCE SIGNS LIST 1 (1A, 1B) Signal transmission system
10 (10A, 10B) Transmission device (transmitting device)
100 Connector receptacle unit
101 Electrode group
102 Electrode group
103 Optical fiber connection unit group
104 Voltage generator
105 Voltage detector
106 Voltage detector
120 Video and audio signal transmitter
130 Multiplexer
140 Multiplexer group
150 Electro-optical converter group
160 Controller
170 Electro-optical converter operation controller
20 Optical-electrical composite cable
200 Connector plug
201 Electrode group
203 Optical fiber connection unit group
204 Cable
30 (30A, 30B) Transmission device (reception device)
300 Connector receptacle unit
301 Electrode group
302 Electrode group
303 Optical fiber connection unit group
304 Voltage generator
305 Voltage detector
306 Voltage detector
310 Video and audio signal decoder
320 Video and audio signal receiver
350 Optical-electric converter group
360 Controller
365 Light reception result
370 Integrator

The invention claimed is:

1. A transmitting device, comprising:
   a connector receptacle unit connected to an optical-electrical composite cable, wherein the connector receptacle unit comprises:
   a first electrode group;
   a second electrode group at a position rotated from the first electrode group by 180 degrees about a center of a main body of the connector receptacle unit;
   a first connection unit group;
   a second connection unit group at a position rotated from the first connection unit group by 180 degrees about the center of the main body of the connector receptacle unit, wherein the first connection unit group and the second connection unit group are configured to transmit optical signals; and
   a controller configured to:
   detect that a determined level of voltage is applied to one of a first voltage detecting electrode of the first electrode group or a second voltage detecting electrode of the second electrode group;
   control oscillation of an optical signal based on the detection that the determined level of voltage is applied to the one of the first voltage detecting electrode or the second voltage detecting electrode; and
   determine a signal path among the first connection unit group and the second connection unit group based on a result of the oscillation of the optical signal.

2. The transmitting device according to claim 1, wherein the first electrode group is connected to a plurality of electrodes of a connector plug of the optical-electrical composite cable in a case where the connector receptacle unit and the connector plug of the optical-electrical composite cable are connected in a first direction.

3. The transmitting device according to claim 2, wherein the second electrode group is connected to the plurality of electrodes of the connector plug of the optical-electrical composite cable in a case where the connector receptacle unit and the connector plug of the optical-electrical composite cable are connected in a second direction that is opposite to the first direction.

4. The transmitting device according to claim 3, wherein the first connection unit group is connected to a first optical fiber group of the optical-electrical composite cable in a case where the connector receptacle unit and the connector plug of the optical-electrical composite cable are connected in the first direction.

5. The transmitting device according to claim 4, wherein the first connection unit group is connected to a second optical fiber group of the optical-electrical composite cable in a case where the connector receptacle unit and the connector plug of the optical-electrical composite cable are connected in the second direction.

6. The transmitting device according to claim 1, wherein the second electrode group includes the second voltage detecting electrode at a position rotated from the first voltage detecting electrode by 180 degrees about the center of the main body of the connector receptacle unit, and
the transmitting device further comprises:
a first voltage detection unit configured to detect a voltage applied to the first voltage detecting electrode, wherein the voltage is applied to the first voltage detecting electrode via the optical-electrical composite cable by a reception device; and
a second voltage detection unit configured to detect a voltage applied to the second voltage detecting electrode, wherein the voltage is applied to the second voltage detection electrode via the optical-electrical composite cable by the reception device.

7. The transmitting device according to claim 6, wherein the controller is further configured to
control switch of an input signal to one of the first connection unit group or the second connection unit group based on the detection that the determined level of voltage is applied to the one of the first voltage detecting electrode or the second voltage detecting electrode.

8. The transmitting device according to claim 6, wherein the oscillation of the optical signal is executed by an electro-optical converter that is connected to the first connection unit group and the second connection unit group.

9. The transmitting device according to claim 1, wherein the first electrode group includes a first voltage applying electrode, and
the second electrode group comprises a second voltage applying electrode at a position rotated from the first voltage applying electrode by 180 degrees about the center of the main body of the connector receptacle unit, and
the transmitting device further comprises:
a voltage generation unit configured to apply the determined level of voltage to the first voltage applying electrode and the second voltage applying electrode.

10. A reception device, comprising:
a connector receptacle unit connected to an optical-electrical composite cable, wherein the connector receptacle unit comprises:
a first electrode group;
a second electrode group at a position rotated from the first electrode group by 180 degrees about a center of a main body of the connector receptacle unit;
a first connection unit group;
a second connection unit group at a position rotated from the first connection unit group by 180 degrees about the center of the main body of the connector receptacle unit, wherein the first connection unit group and the second connection unit group are configured to receive optical signals; and
a controller configured to:
detect that a determined level of voltage is applied to one of a first voltage detecting electrode of the first electrode group or a second voltage detecting electrode of the second electrode group;
determine light reception results by an optical-electric converter group connected to the first connection unit group and the second connection unit group, based on the detection that the determined level of voltage is applied to the one of the first voltage detecting electrode or the second voltage detecting electrode; and
determine a signal path among the first connection unit group and the second connection unit group based on the light reception results.

11. The reception device according to claim 10, wherein the first electrode group is connected to a plurality of electrodes of a connector plug of the optical-electrical composite cable in a case where the connector receptacle unit and the optical-electrical composite cable are connected in a first direction.

12. The reception device according to claim 11, wherein the second electrode group is connected to the plurality of electrodes of the connector plug of the optical-electrical composite cable in a case where the connector receptacle unit and the optical-electrical composite cable are connected in a second direction that is opposite to the first direction.

13. The reception device according to claim 12, wherein the first connection unit group is connected to a first optical fiber group of the optical-electrical composite cable in a case where the connector receptacle unit and the connector plug of the optical-electrical composite cable are connected in the first direction.

14. The reception device according to claim 13, wherein the first connection unit group is connected to a second optical fiber group of the optical-electrical composite cable in a case where the connector receptacle unit and the connector plug of the optical-electrical composite cable are connected in the second direction.

15. The reception device according to claim 10, wherein the second electrode group comprises the second voltage detecting electrode at a position rotated from the first voltage detecting electrode by 180 degrees about the center of the main body of the connector receptacle,
the reception device further comprises:
a first voltage detection unit configured to detect a voltage applied to the first voltage detecting electrode, wherein the voltage is applied to the first voltage detecting electrode via the optical-electrical composite cable by a transmitting device; and
a second voltage detection unit configured to detect a voltage applied to the second voltage detecting electrode, wherein
the voltage is applied to the second voltage detecting electrode via the optical-electrical composite cable by the transmitting device.

16. The reception device according to claim 15, wherein the controller is further configured to:
control switch of a signal output destination to at least one of the first connection unit group or the second connection unit group based on the detection that the determined level of voltage is applied to at least one of the first voltage detecting electrode and the second voltage detecting electrode.

17. The reception device according to claim 10, wherein
the first electrode group includes a first voltage applying electrode, and
the second electrode group comprises a second voltage applying electrode provided at a position rotated from the first voltage applying electrode by 180 degrees about the center of the main body of the connector receptacle unit, and
the reception device further comprises:
a voltage generation unit configured to apply the determined level of voltage to the first voltage applying electrode and the second voltage applying electrode.

18. An optical-electrical composite cable, comprising:
a transmission-side connector plug connected to a transmitting device, wherein the transmission-side connector plug comprises:
    a transmission-side electrode group connected to one of a first electrode group or a second electrode group of a connector receptacle unit of the transmitting device; and
    an optical fiber group connected to a connection unit group of the connector receptacle unit of the transmitting device, wherein
        the connection unit group is configured to transmit optical signals, and
        the connection unit group comprises a first connection unit group and a second connection unit group,
    a determined level of voltage is applied to one of a first voltage detecting electrode of the first electrode group or a second voltage detecting electrode of the second electrode group,
    an oscillation of an optical signal is controlled based on the determined level of voltage applied to the one of the first voltage detecting electrode or the second voltage detecting electrode, and
    one of the first connection unit group or the second connection unit group is determined as a signal path based on a result of the oscillation of the optical signal.

19. The optical-electrical composite cable according to claim 18, further comprising:
a reception-side connector plug connected to a reception device, wherein the reception-side connector plug comprises:
    a reception-side electrode group connected to the one of the first electrode group or the second electrode group of a connector receptacle unit of the reception device; and
    a metal wire configured to connect the transmission-side electrode group and the reception-side electrode group.

* * * * *